(12) United States Patent
Nick et al.

(10) Patent No.: US 8,287,733 B2
(45) Date of Patent: Oct. 16, 2012

(54) MEMBRANE BIOREACTOR

(76) Inventors: Juergen T. Nick, Carefree, AZ (US);
Johan A. Perslow, Carlsbad, CA (US);
James A. Matthews, Jr., Lake Forest, CA (US)

( * ) Notice: Subject to any disclaimer, the term of this patent is extended or adjusted under 35 U.S.C. 154(b) by 382 days.

(21) Appl. No.: 12/549,346

(22) Filed: Aug. 27, 2009

(65) Prior Publication Data
US 2010/0072131 A1      Mar. 25, 2010

Related U.S. Application Data

(60) Provisional application No. 61/093,226, filed on Aug. 29, 2008, provisional application No. 61/092,653, filed on Aug. 28, 2008.

(51) Int. Cl.
*C02F 3/30* (2006.01)
(52) U.S. Cl. .......................... 210/605; 210/259
(58) Field of Classification Search .................. 210/605, 210/252, 259
See application file for complete search history.

(56) References Cited

U.S. PATENT DOCUMENTS

| | | | | |
|---|---|---|---|---|
| 6,136,194 | A * | 10/2000 | Vogel et al. | 210/605 |
| 6,203,703 | B1 * | 3/2001 | Yerushalmi et al. | 210/615 |
| 7,147,777 | B1 * | 12/2006 | Porteous | 210/605 |
| 7,147,778 | B1 * | 12/2006 | DiMassimo et al. | 210/605 |
| 2002/0084219 | A1 * | 7/2002 | Yamasaki et al. | 210/620 |
| 2005/0126963 | A1 * | 6/2005 | Phagoo et al. | 210/110 |
| 2007/0075017 | A1 * | 4/2007 | Kuzma | 210/605 |
| 2009/0014387 | A1 * | 1/2009 | Probst | 210/650 |

OTHER PUBLICATIONS

Jim Bishop, "Choices Abound in Headworks Equipment Market," WE&T Magazine (Water Environment & Technology), Mar. 2008, 12 pages.
Esposito, K. et al.; "The Role of Water Reclamation in Water Resources Management in the 21st Century"; WEFTEC 2005; pp. 8621-8633.
METCALF & Eddy | AECOM; "Construction Plans for Kukui'ula WWTP Relocation", Koloa, Kauai, Hawaii, 17pp., May 12, 2006 (and other dates as indicated).

* cited by examiner

*Primary Examiner* — Fred Prince
(74) *Attorney, Agent, or Firm* — Christie, Parker & Hale, LLP

(57) ABSTRACT

The present invention relates to wastewater treatment facilities, and more particularly to an improved membrane bioreactor for treatment of wastewater. In one embodiment, a membrane bioreactor for treatment of wastewater includes first and second anoxic basins for anoxic treatment of such wastewater, and first and second aerobic basins for aerobic treatment of such wastewater. The bioreactor also includes a first flow path connecting the first anoxic basin and the first aerobic basin, and a second flow path connecting the second anoxic basin and the second aerobic basin, for flow of the wastewater from the respective anoxic basin into the respective aerobic basin. The bioreactor also includes a membrane chamber with a plurality of membrane tanks, the membrane chamber being arranged in series with the aerobic basins, and the membrane tanks being arranged in parallel with each other, and third and fourth flow paths connecting the membrane chamber to the first and second aerobic basins. The membrane chamber may extend into the aerobic basin.

37 Claims, 20 Drawing Sheets

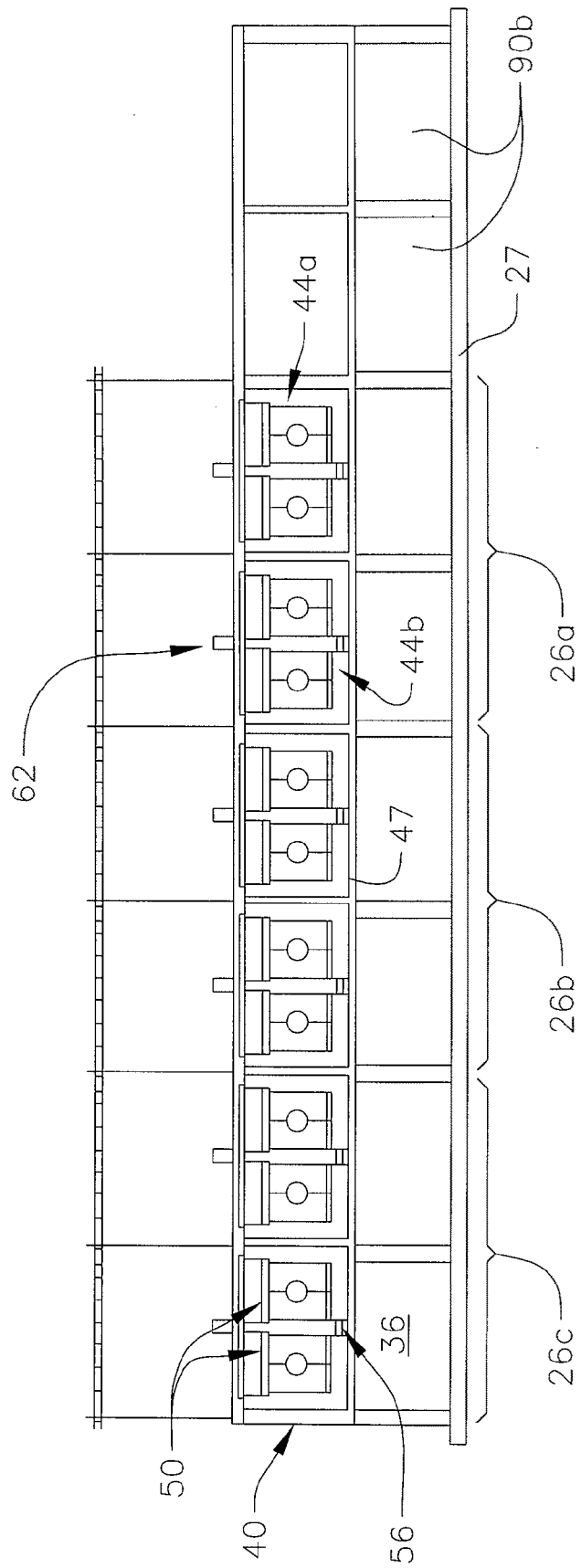

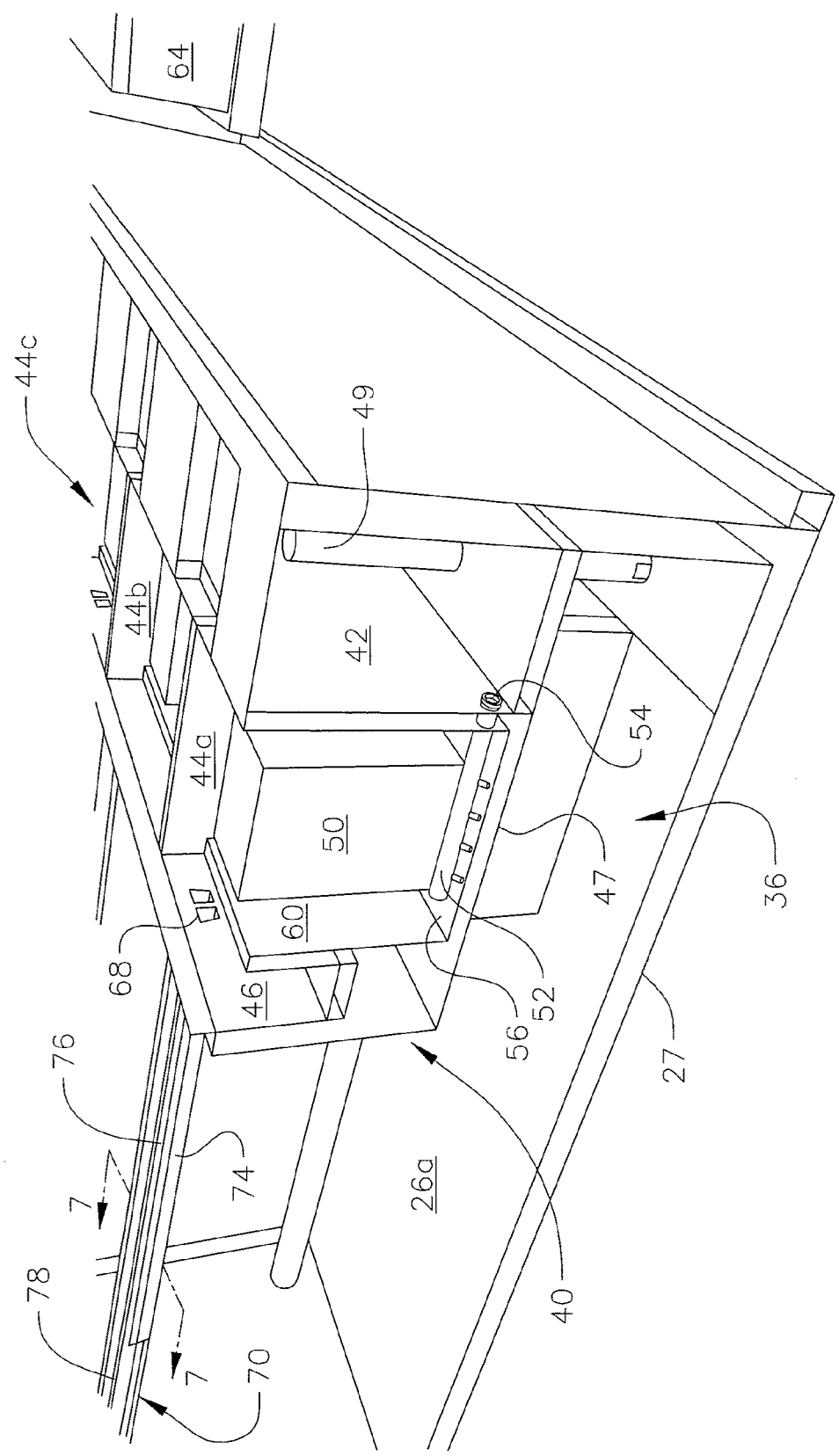

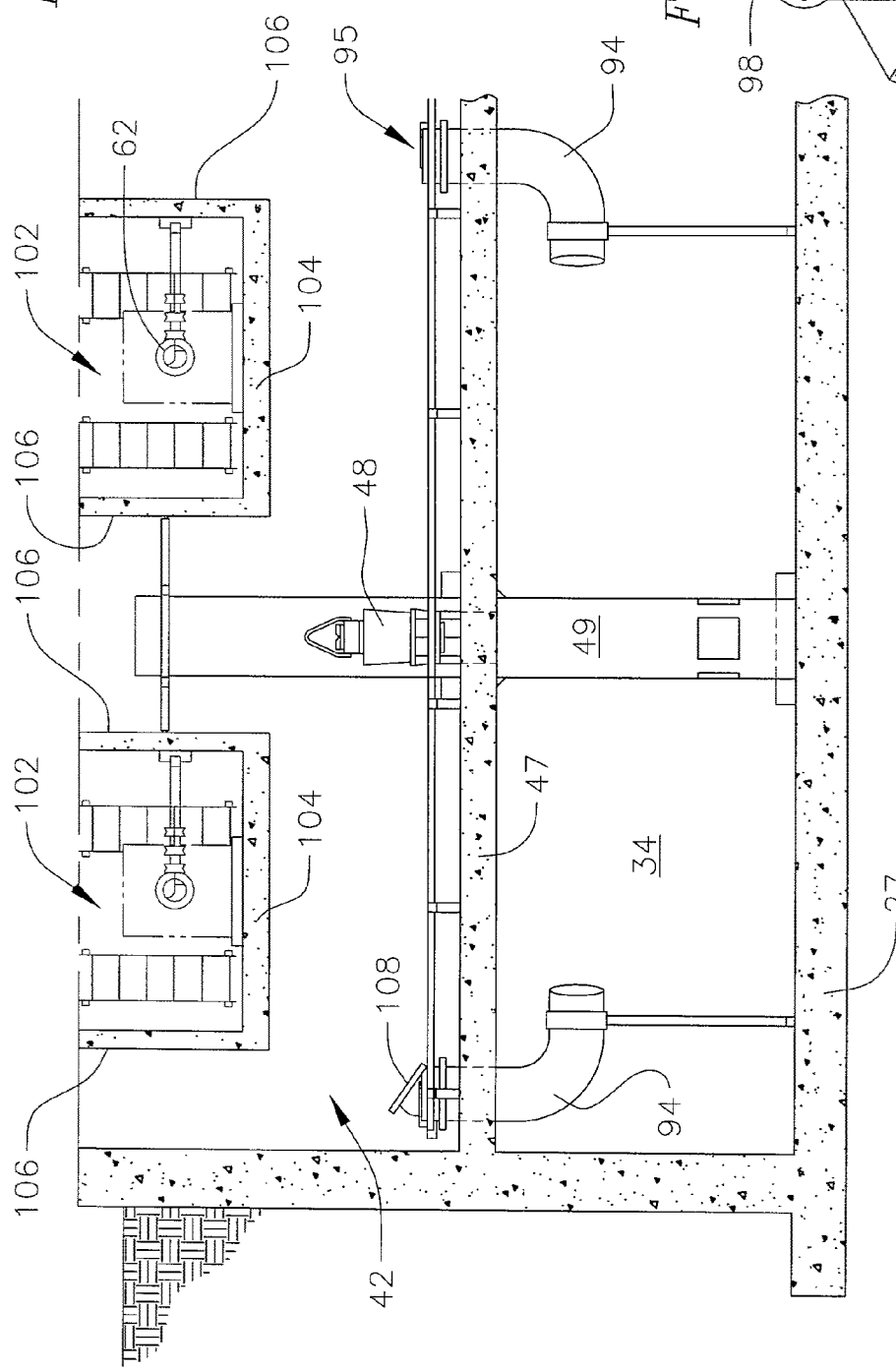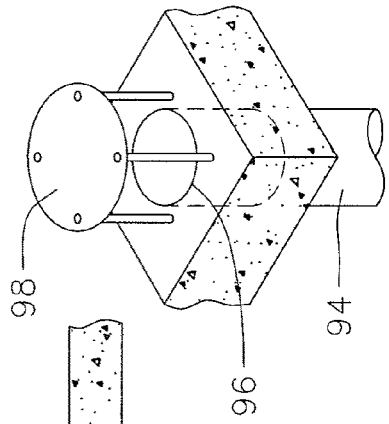

US 8,287,733 B2

MEMBRANE BIOREACTOR

CROSS-REFERENCE TO RELATED APPLICATIONS

This application claims priority to and the benefit of U.S. Provisional Patent Application No. 61/093,226, filed on Aug. 29, 2008 and U.S. Provisional Patent Application No. 61/092,653, filed on Aug. 28, 2008, the contents of both of which are incorporated herein by reference.

FIELD OF THE INVENTION

The present invention relates to wastewater treatment facilities, and more particularly to an improved design of a membrane bioreactor for treatment of wastewater.

BACKGROUND

Membrane bioreactors are one of several types of Activated Sludge Process wastewater treatment facilities designed to remove contaminants from domestic and runoff wastewater. This wastewater comes from residences, businesses, industry, and runoff water from rainfall or flooding. Wastewater treatment facilities remove organic and solid waste from water so that the water can be recycled back into the environment. A facility should be able to accommodate dry and wet weather flows and peak flows.

A membrane bioreactor (MBR) employs micro-filters (membranes) that separate clean water from solid waste and sludge. First, the water is biologically treated in an aerobic process by micro-organisms that consume the organic contaminants in the water and produce solid waste sludge. Then, the water is drawn through the micro-filters, which separate the water from the sludge. Typically, the clean water is pumped out of the micro-filters. The majority of the water (the "return activated sludge") is recycled back to the aerobic process, and a smaller amount (the "waste activated sludge") is processed for suitable disposal, such as at a landfill.

While membrane bioreactors provide an effective method for treating wastewater, they have some drawbacks. Many bioreactor designs contain several tanks and basins through which the wastewater flows in series, and as a result repair and maintenance of an individual tank requires a large portion of the bioreactor to be taken off-line. This can significantly reduce the operating capacity of the bioreactor. In general, a waste water treatment facility with n tanks should meet the design criteria with n-1 tanks in operation. Additionally, the bioreactor requires the wastewater to be recycled back through the different tanks multiple times for adequate treatment of the water. Some existing bioreactors use multiple, complex pipe systems, channels, and pumps to recycle and divert the wastewater as needed. These piping systems can be expensive to install and maintain. Also, membrane bioreactors operate at higher concentrations of Mixed Liquor Suspended Solids (MLSS) than other treatment facilities. The recycling rate of the wastewater from the MBR back to the aerobic zone is approximately three to five times greater than extraction of permeate (filtered water) through the membrane.

Accordingly, there is a need for an improved membrane bioreactor that can be more easily operated and maintained.

SUMMARY OF THE INVENTION

The present invention relates to wastewater treatment facilities, and more particularly to an improved membrane bioreactor for treatment of wastewater. In one embodiment, a membrane bioreactor for treatment of wastewater includes first and second anoxic basins for anoxic treatment of such wastewater, and first and second aerobic basins for aerobic treatment of such wastewater. The first and second aerobic basins are arranged in series with the first and second anoxic basins, respectively. The bioreactor also includes a first flow path connecting the first anoxic basin and the first aerobic basin, and a second flow path connecting the second anoxic basin and the second aerobic basin, for flow of the wastewater from the respective anoxic basin into the respective aerobic basin. The bioreactor also includes a membrane chamber with a plurality of membrane tanks, the membrane chamber being arranged in series with the aerobic basins, and the membrane tanks being arranged in parallel with each other, and third and fourth flow paths connecting the membrane chamber to the first and second aerobic basins. In an embodiment, a common wall is shared by each of the following: the first anoxic basin and the first aerobic basin, the second anoxic basin and the second aerobic basin, the first and second anoxic basins, and the first and second aerobic basins. In an embodiment, the first and second aerobic and anoxic basins and the membrane chamber are covered.

In one embodiment, a membrane bioreactor for treatment of wastewater includes first and second anoxic basins for anoxic treatment of such wastewater, and first and second aerobic basins for aerobic treatment of such wastewater. The first and second aerobic basins are arranged in series with the first and second anoxic basins, respectively. The MBR also includes a first flow path connecting the first anoxic basin and the first aerobic basin, and a second flow path connecting the second anoxic basin and the second aerobic basin, for flow of the wastewater from the respective anoxic basin into the respective aerobic basin. The MBR also includes a membrane chamber comprising a plurality of membrane tanks, the membrane chamber being arranged in series with the aerobic basins, and the membrane tanks being arranged in parallel with each other, and third and fourth flow paths connecting the membrane chamber to the first and second aerobic basins. The membrane chamber extends into at least one of the aerobic basins.

In another embodiment, a membrane bioreactor for treatment of wastewater includes first and second anoxic basins for anoxic treatment of such wastewater, and first and second aerobic basins for aerobic treatment of such wastewater. The first and second aerobic basins are connected by first and second fluid flow paths to the first and second anoxic basins, respectively, for flow of the wastewater from the respective anoxic basin into the respective aerobic basin. The MBR also includes a membrane chamber extending into the first and second aerobic basins. The membrane chamber has a common inlet channel, a common outlet channel, a plurality of membrane tanks between the common inlet channel and the common outlet channel, and a plurality of feed pipes extending between the common inlet channel and the membrane tanks. The membrane chamber has a floor elevated above a floor of the aerobic basins. The MBR also includes a membrane module in each of the plurality of membrane tanks, a first conduit extending from the common outlet channel to the first aerobic basin, and a second conduit extending from the common outlet channel to the second aerobic basin.

In another embodiment, a method of treating wastewater in a membrane bioreactor includes screening the wastewater, anoxically treating the wastewater in first and second anoxic basins arranged in parallel on a first level of the membrane bioreactor, and aerobically treating the wastewater in first and second aerobic basins arranged in parallel on the first level.

The first aerobic basin is arranged in series with the first anoxic basin, and the second aerobic basin is arranged in series with the second anoxic basin. The method also includes pumping the wastewater from the first and second aerobic basins into an elevated common inlet channel, passing the wastewater from the common inlet channel into a plurality of membrane tanks arranged in parallel, drawing a first portion of the wastewater through a plurality of membranes located in each membrane tank, passing a second portion of the wastewater from the plurality of membrane tanks into a common outlet channel, and passing the second portion of the wastewater from the common outlet channel to the first and second aerobic basins through first and second conduits. The first conduit connects the common outlet channel to the first aerobic basin, and the second conduit connects the common outlet channel to the second aerobic basin. The method also includes housing operating equipment for the membrane bioreactor on a second level of the bioreactor above the first level.

BRIEF DESCRIPTION OF THE DRAWINGS

FIG. 3 is a vertical cross-sectional view taken along the line 3-3 of FIG. 2;

FIG. 4A is an enlarged perspective view of a portion of the membrane bioreactor of FIG. 1;

FIG. 12D is a partial end cross-sectional view of the membrane bioreactor of claim 12A, taken along the line 12D.

FIG. 12E is a perspective view of an outlet according to the embodiment of FIG. 12A.

DETAILED DESCRIPTION OF THE INVENTION

The present invention relates to wastewater treatment facilities, and more particularly to an improved membrane bioreactor for treatment of wastewater. The membrane bioreactor passes wastewater through an anoxic basin, an aerobic basin, and a membrane chamber and recycles the water through these basins several times to thoroughly treat the water. The water is biologically treated in the anoxic and aerobic basins and then is filtered through membranes in the membrane chamber, as described more fully below. In one embodiment, the improved membrane bioreactor has a modular design that incorporates common fill channels and effluent channels to enable individual tanks to be taken off-line for repair or maintenance without disrupting the operation of other tanks up- or downstream. The modular design enables up- or downstream tanks to continue operating at full capacity even when one of the tanks in series requires maintenance or repair. Additionally, in one embodiment, the improved membrane bioreactor provides a compact design by utilizing structural components for process steps, by arranging components to maximize the use of gravity to move the wastewater through the bioreactor, and by constructing the membrane chamber to extend into the aerobic basin, as described more fully below. A compact and efficient headworks station is also provided in an embodiment.

Figure 1:
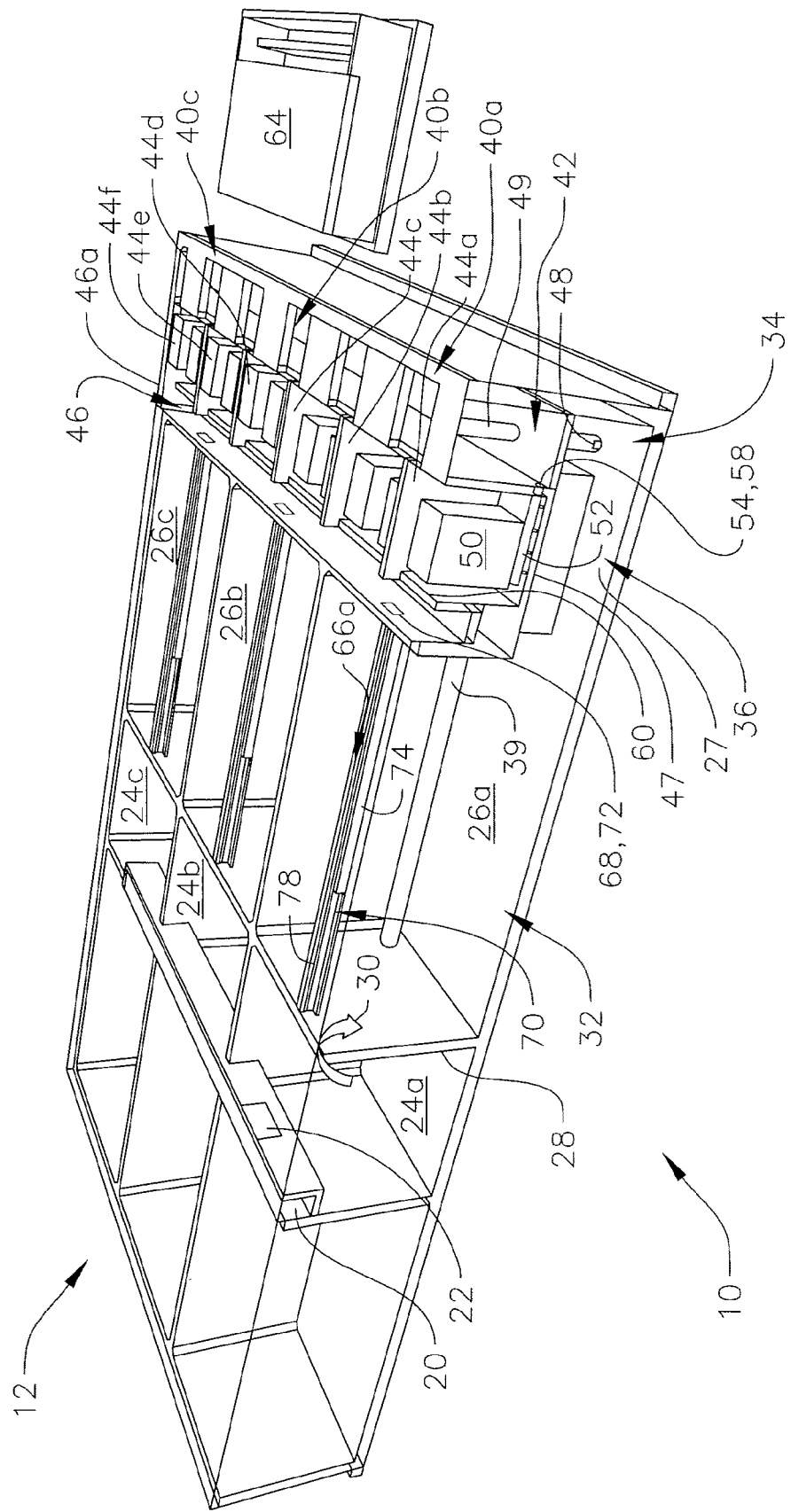
FIG. 1 is a front and side perspective view of a lower level of a membrane bioreactor according to an exemplary embodiment of the invention with a front wall and equalization basins removed.
Figure 2:
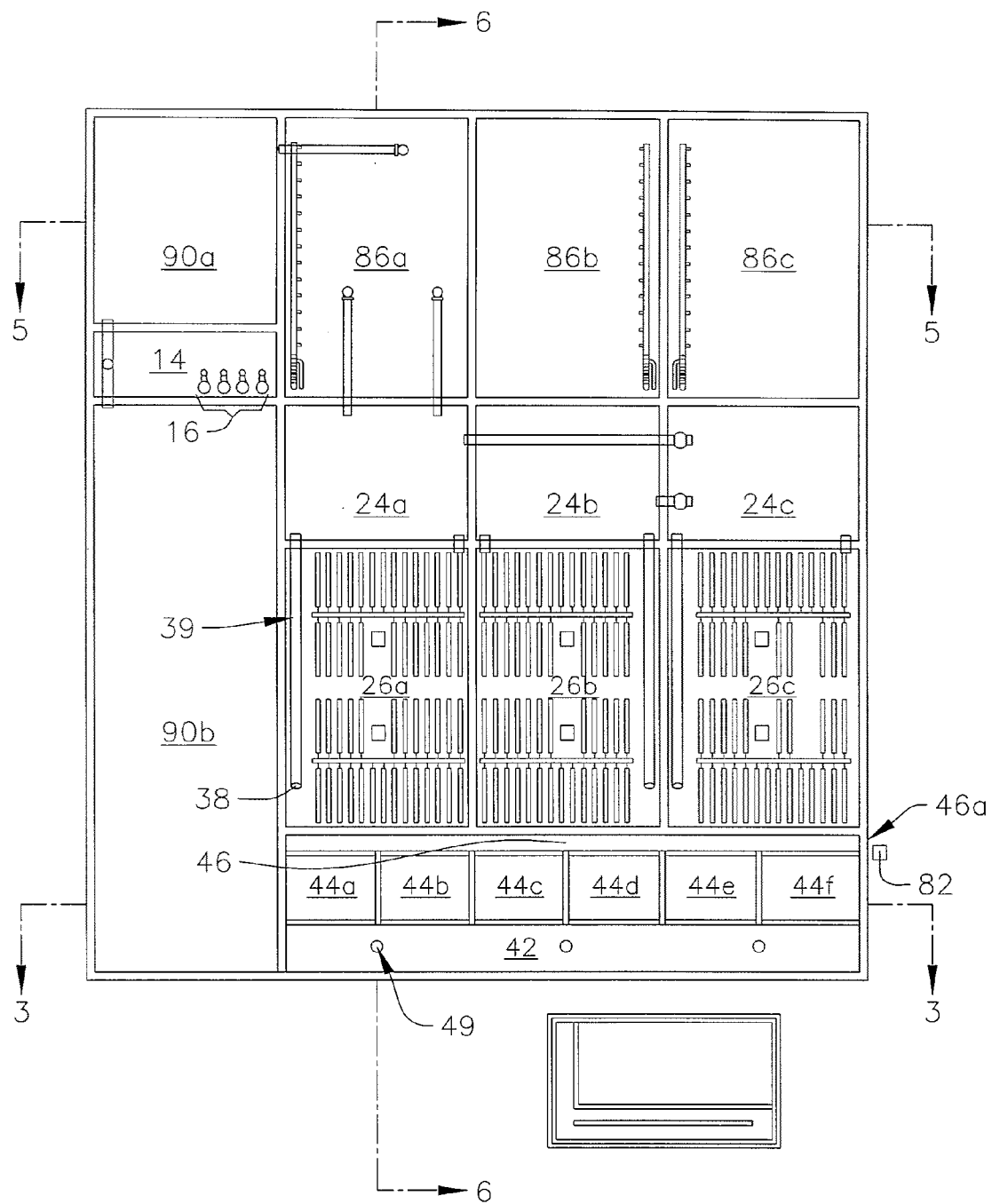
FIG. 2 is a plan view of the lower level of the membrane bioreactor of FIG. 1.
Figure 5:
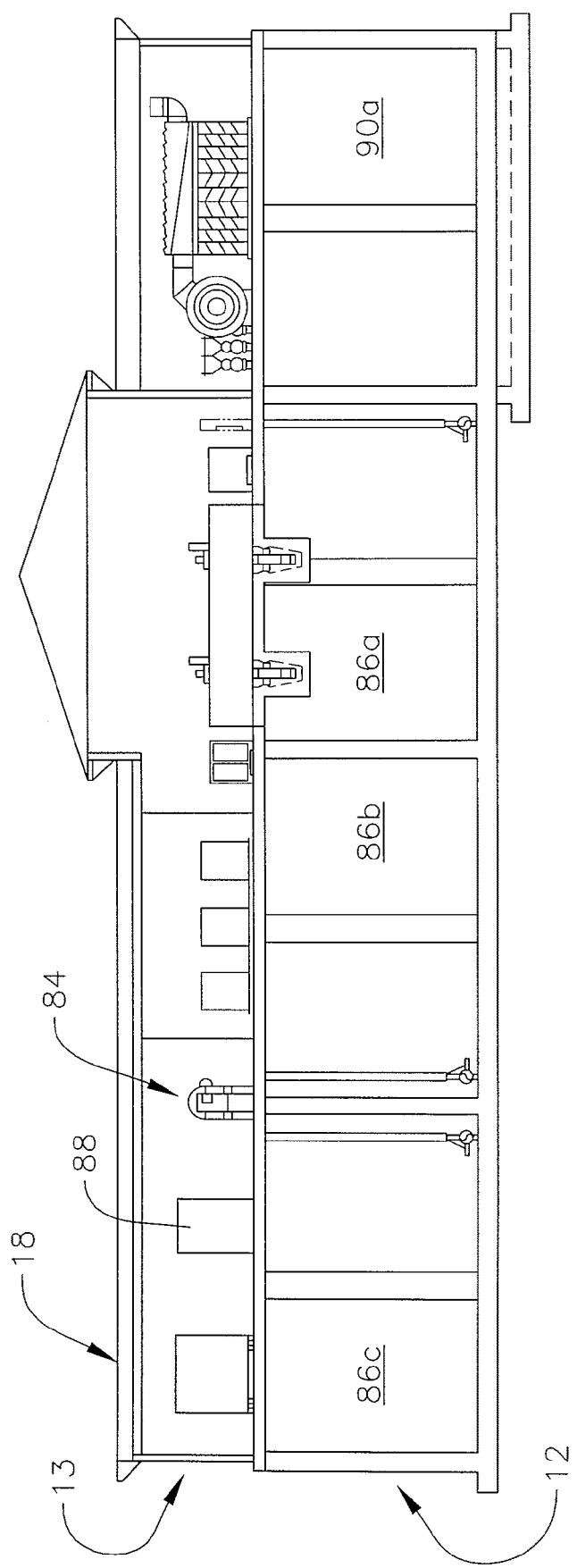
FIG. 5 is a vertical cross-sectional view taken along the line 5-5 of FIG. 2.
Figure 6:
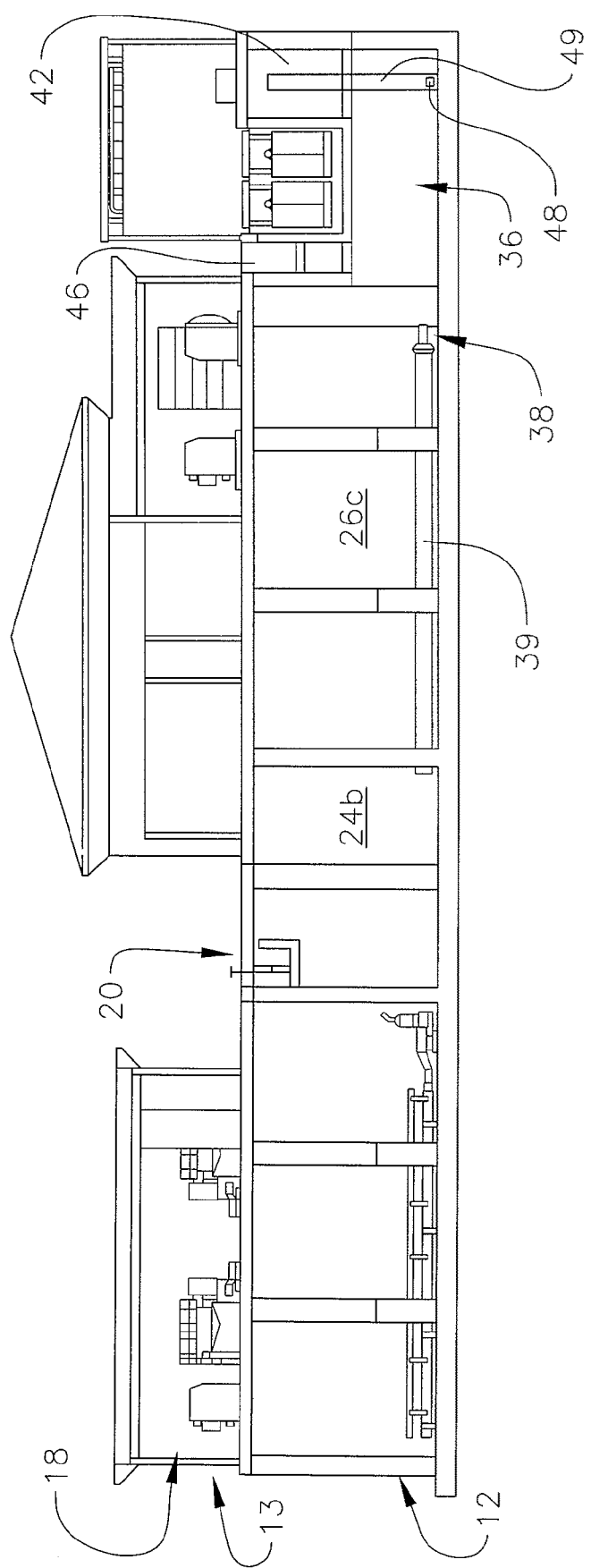
FIG. 6 is a vertical cross-sectional view taken along the line 6-6 of FIG. 2.

FIG. 1 is a front and right side perspective view of a lower level 12 of an improved membrane bioreactor ("MBR") 10, according to one embodiment of the invention. A plan view of the lower level 12 is shown in FIG. 2. Sewer lines (not shown) convey raw sewage to an influent lift station 14 (see FIG. 2). One or more lift station pumps 16 pump the entering wastewater into a headworks station 18 on an upper level 13 of the MBR 10. The headworks station 18 is shown in FIGS. 5 and 6 and described in more detail later. Four lift station pumps 16 are shown in FIG. 2. These pumps 16 can be individually adjusted to control the incoming flow rate from the sewer line through the lift station 14 and thereby manage downstream loads. The headworks station 18 screens the incoming wastewater to remove trash, dirt, grit, and other solid debris. The screened wastewater then passes by gravity flow from the headworks station 18 into an anoxic inlet splitter channel 20 (see FIGS. 1 and 6), which directs the wastewater through three different inlets or weirs 22 into three different anoxic basins 24a, 24b, 24c.

The anoxic inlet splitter channel 20 separates the wastewater into three parallel treatment trains. The anoxic basins 24 operate under oxygen-depleted conditions, meaning at a low oxygen level, to condition the water and provide nutrient removal. Chemical oxygen (bound to other elements) may be present, but no oxygen is added to the anoxic basins 24. In the anoxic reactor, incoming untreated waste water is mixed with oxygen enriched return activated sludge from the aerobic basin, but no oxygen is added to the anoxic basin by means of aeration. The anoxic basins 24 are used to denitrify the wastewater. Denitrification is one of the steps employed to remove nutrients from the incoming wastewater. Nutrient removal is necessary because nutrient-rich wastewater that is discharged back into the environment can cause rapid and destructive overgrowth of algae and weeds. Nutrients can be removed from the wastewater by converting ammonia, a natural constituent of wastewater, into nitrate (nitrification) and then converting nitrate into nitrogen gas (denitrification). The nitrogen gas produced by this process can simply be released into the atmosphere. Denitrification requires anoxic conditions to encourage formation of the appropriate biological groups to process the sewage. Nitrified wastewater is recycled into the anoxic basin 24 from the aerobic basin, as described more fully below, and then denitrification takes place in the anoxic basin, to complete the nutrient removal and release nitrogen gas to the atmosphere. Mixers in the anoxic basin keep the solids suspended in the water during this process so they do not accumulate on the basin floor.

The nitrification, denitrification, and biological processes performed within the MBR are described in detail in Metcalf & Eddy, 4th Edition; the disclosures in Chapters 8.5 "Processes for Biological Nitrogen Removal" and Chapter 11 "Advanced Waste Water Treatment" are hereby incorporated by reference for all purposes. In another embodiment, the MBR contains an anaerobic basin (not shown) with a phosphorous removal process. The anaerobic basin is located before the anoxic basin, such that the wastewater flows from the anaerobic basin to the anoxic basin and then to the aerobic basin. Where the term "wastewater" or "water" is used herein to refer to the water undergoing the biological processes in the MBR, the wastewater could also be called "mixed liquor suspended solids" or "MLSS."

As shown in FIG. 1, wastewater in the MBR 10 passes from the anoxic basins 24a, 24b, 24c into larger aerobic basins 26a, 26b, 26c. In the illustrated embodiment, the anoxic basins 24 occupy approximately one quarter of the combined total volume of the system made up of the anoxic basins 24, the aerobic basins 26, and the membrane chamber 40 (described below). The aerobic basins 26 occupy approximately two thirds of this combined total volume, leaving approximately one twelfth ($\frac{1}{12}$) for the membrane chambers 40. The aerobic basins 26 have a first or inlet end 32 proximate the anoxic basin 24 and a second or outlet end 34 below the membrane chamber 40. The wastewater flows over a wall 28 between the anoxic and aerobic basins, via the flow path 30, into the first end 32 of the aerobic basin 26.

In the aerobic basin 26, micro-organisms in the water consume the organic waste in the water and convert it into solid sludge. Oxygen is added to the water to create aerobic conditions that promote the growth of these micro-organisms. Oxygen is delivered to the aerobic basins 26 by diffusers and blowers (not shown) in order to maintain appropriate dissolved oxygen levels. The aerobic basin 26 also facilitates nitrification of the wastewater, which is the conversion of ammonia into nitrate.

The biologically treated, nitrified wastewater is then recycled from the aerobic basin 26 back to the anoxic basin 24 for denitrification to complete the removal of nutrients in the water. This recycling takes place from the second end 34 of the aerobic basin 26. The wastewater flows through the aerobic basin 26 toward the second end 34 of the aerobic basin. From there, a recycle pump 38 (see FIG. 2) sends the nitrified wastewater through a recycle pipe 39 back to the anoxic basin 24. In FIG. 1, the recycle pipe 39 is shown in the first aerobic basin 26a near the second aerobic basin 26b, while in FIG. 2 the pipe 39 is shown opposite the second aerobic basin 26b. The placement of this pipe 39 within the aerobic basin is not crucial, as long as it directs wastewater from the second end 34 of the aerobic basin 26 back to the anoxic basin 24. The recycle pump 38 pumps approximately three to five times the daily inflow of wastewater back through the pipe 39 into the anoxic basin, which means that an average molecule of water flowing through the MBR 10 passes through the anoxic basin 24 and aerobic basin 26 four to six times. This recycling ensures that the wastewater is thoroughly treated before progressing beyond the aerobic section.

Additionally, recycling the water to the anoxic basin 24 from the second end 34 of the aerobic basin 26 prevents excessive oxygen from being returned to the anoxic basin 24. When the water reaches the inlet of the recycle pipe 39, it has passed through most of the aerobic basin 26. During that time the micro-organisms in the water have consumed much of the oxygen added to the aerobic basin 26. Thus, anoxic conditions can be maintained in the anoxic basin 24 despite the recycling of water from the aerobic basin 26 by placing the inlet of the pipe 39 at or near the second or outlet end 34 of the aerobic basin 26, where dissolved oxygen levels are maintained at very low levels.

Wastewater passing through the aerobic basin 26 ultimately reaches the second end 34 of the aerobic basin 26, shown in more detail in FIGS. 3 and 4. A membrane chamber 40a, 40b, 40c extends into each aerobic basin 26a, 26b, 26c at the second end 34 of the aerobic basin. The membrane chamber 40 is elevated above and separated from the lower aerobic zone 36 of the aerobic basin 26. The membrane chamber 40 includes a common inlet channel 42, one or more membrane tanks 44a-f, and a common outlet channel 46. In the embodiment shown, each membrane chamber 40 includes two membrane tanks 44. The membrane chamber 40 includes a floor 47 suspended above the floor 27 of the aerobic basin 26. In the embodiment shown in FIG. 4A, the membrane chamber 40 is entirely contained within the aerobic basin 26, although in other embodiments it may extend only partially into the aerobic basin 26. The construction of the membrane chamber 40 as shown in FIG. 4A provides a compact design that reduces the overall footprint of the MBR facility by housing the membrane chamber 40 within the aerobic basin 26.

A membrane inlet feed pump 48 (see FIG. 6) located at the second end 34 of each aerobic basin 26 lifts the treated wastewater through a membrane inlet feed pipe 49 into the common inlet channel 42 of the membrane chamber 40. The three wastewater treatment trains from the three aerobic basins 26a, 26b, 26c combine in the common inlet channel 42. Of course, three treatment trains are not required, and in other embodiments, less than two, or more than two trains may be provided.

The common inlet channel 42 feeds into the individual membrane tanks 44a-f. The membrane tanks 44 house membrane modules 50 that provide the necessary separation of solid and liquid to produce clear water that is pumped out of the MBR. Each membrane tank 44 includes one or more membrane modules 50. In FIGS. 3 and 5, four modules 50 are shown in each tank 44. In other embodiments, more than four modules or less than four may be housed in each tank 44. The membrane modules can be outfitted with flat membranes, hollow fiber membranes, ceramic type membranes, or other suitable membranes. The process description below is based on hollow fiber membranes, as an example.

Wastewater that passes through the aerobic basins 26a, 26b, 26c and up through the membrane inlet feed pipes 49a, 49b, 49c combines in the common inlet channel 42. From there, the water passes by gravity flow into the various membrane tanks 44. When a membrane tank 44 is open and operating, the water flows through a membrane tank feed pipe 52 at or near the floor 47 into the membrane tank 44. The membrane tank feed pipe 52 has an inlet 54 that opens into the common inlet channel 42 and an outlet 56 that opens into the membrane tank 44. A flow controlling or flow shut off device such as but not limited to a movable gate, valve, telescoping valve, etc. 58 (see FIG. 4B) can be positioned in front of the inlet 54 to block flow to an individual membrane tank 44 when that tank requires maintenance or cleaning. When the flow controlling/flow shut off device 58 is closed, no water will flow into the tank from the common inlet channel 42. When the device 58 is open, water flows into the inlet 54, through the pipe 52, and out of the outlet 56 into the membrane tank 44.

Most of the wastewater entering the membrane tank 44 will flow around the fibers in the membrane module 50 and will flow by gravity over the outlet weir 60 into the common outlet channel 46. However, a portion of the treated water is drawn through the fibers in the module 50. Permeate pumps 62 apply a vacuum to the fibers to draw water (in case a hollow fiber membrane is used) through the fibers. The fibers act as microfilters and prevent any solid material or micro-organisms from passing through the fibers. The fiber acts as a barrier to the solids and micro-organism in the water, and thus the water that enters the fibers leaves any solid waste behind on the outer surface of the fiber. Only clean, clear water is drawn through the fibers themselves. This clear water is pumped out of the membrane tank 44 via the permeate pump 62 (see FIG. 3). This pump 62 delivers the clear water to a disinfection station 64 (see FIG. 1) where the clear water is disinfected, as described more fully below. This clear water drawn through the membrane fibers is thus pumped out of the MBR for post-processing and release back to the environment.

The solid waste filtered out of the clear water accumulates on the outer surface of the fiber bundles in the membrane module 50. An air scour is applied across the surface of the fibers to dislodge the solid waste and return it to the wastewater flowing through the membrane tank 44 around the membrane fibers. Water that is not drawn through the membrane fibers flows around them and passes over the outlet weir 60. Solid waste accumulating on the fibers is dislodged by the air scour and returned to the wastewater flow. The air scour is applied via air cycling valves, and it can be run intermittently or applied continuously during high flow rates, depending on the type of membrane used. The air scour also adds oxygen to the wastewater before it is returned to the first end 32 of the aerobic basin, where high oxygen levels are desirable. The solids can also be dislodged by a periodic backflush of water, during which the flow through the membrane fibers is reversed back through the fibers to dislodge solid material on the surface.

The wastewater and dislodged solids flow by gravity over the weir 60 into the common outlet channel 46, where the wastewater from all of the membrane tanks 44 combines. From the outlet channel 46, the water is divided again into three parallel trains to return to the aerobic basins 26. As shown in FIG. 1, a conduit 66a, 66b, 66c extends from the common outlet channel 46 to the first end 32 of each aerobic basin 26a, 26b, 26c. The conduit 66 has an inlet 68 at the common outlet channel 42 and an outlet 70 near the first end 32 of the aerobic basin 26. Similar to the membrane tank feed pipe 52, the conduit 66 has a flow controlling or flow shut off device such as, but not limited to, a movable gate, valve, telescoping valve 72 (see FIG. 4B) that can block the inlet 68. When the flow controlling/flow shut off device 72 is closed, no water will flow into the conduit to the aerobic basin. For example, if the aerobic basin 26a requires maintenance or cleaning, the gate 72a can be moved down to block the inlet 68a to prevent the return of water to the aerobic basin 26a. Simultaneously, the inlet 22a to the anoxic basin 24a from the anoxic splitter box 20 can be blocked, so that no water will enter the anoxic basin 24a or the aerobic basin 22a. These two basins can be cleaned or repaired as required, while the other two parallel processing trains continue to operate normally.

When the device 72 is open, the wastewater and suspended solids flow into the conduit 66. In one embodiment, the conduit 66 includes sidewalls 74 that form a trough or flow path 76 inside the conduit 66. At or near the first end 32 of the aerobic basin 26, the conduit 66 includes a portion 78 where the sidewall is removed, or where an opening is formed in the sidewall, creating the outlet portion 70 for the conduit 66. The wastewater flowing through the conduit 66 flows through this portion 78 and drops down into the first end 32 of the aerobic basin 26. The conduit 66 can be sloped from the common outlet channel 46 to the first end 32 of the aerobic basin 26 to facilitate gravity flow into the aerobic basin.

Figure 7A:
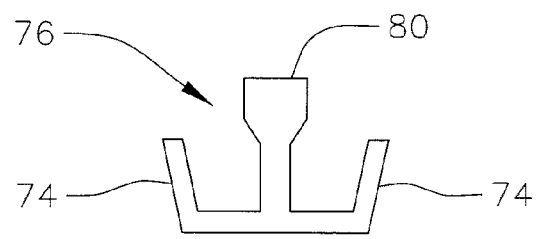
FIG. 7A is a vertical cross-sectional view of a conduit of a membrane bioreactor according to an exemplary embodiment, taken along the line 7-7 of FIG. 4A.
Figure 7B:
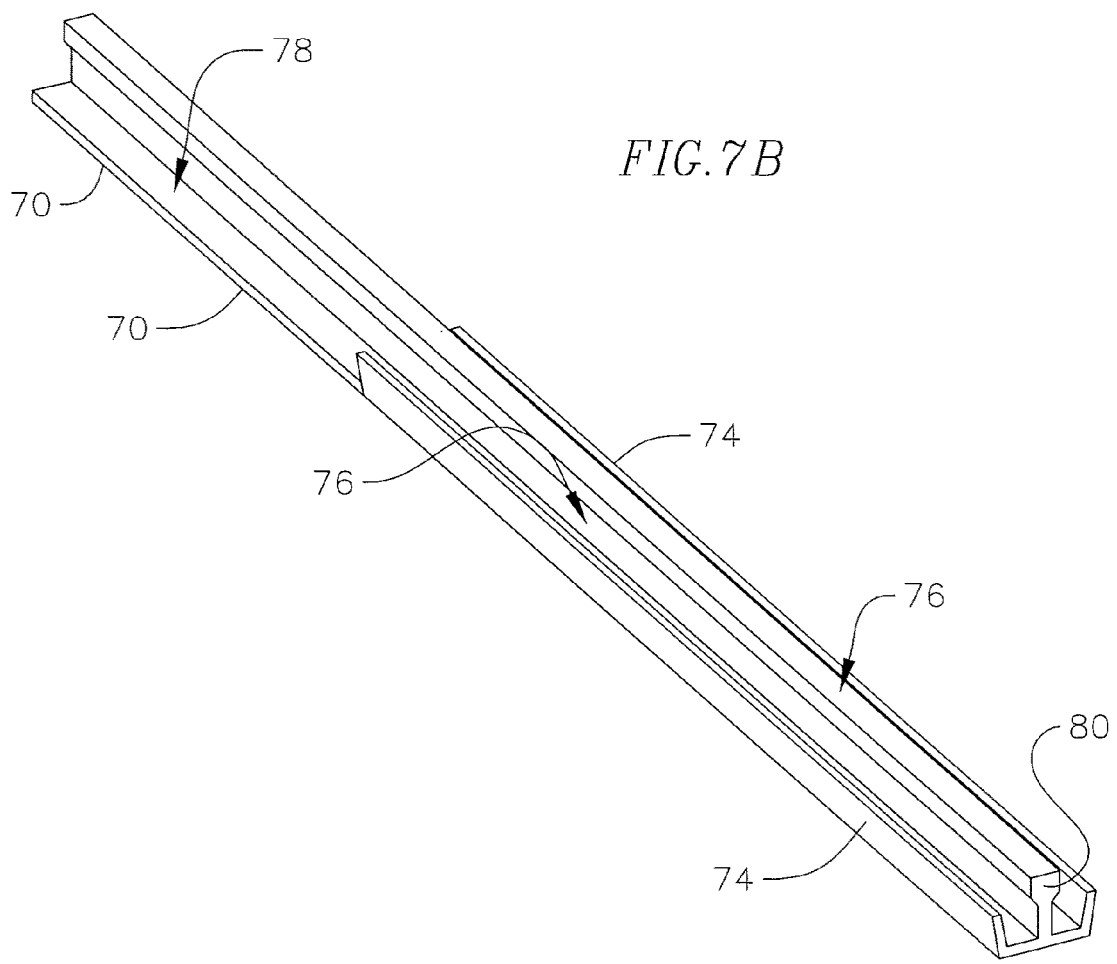
FIG. 7B is a perspective view of the conduit of FIG. 7A.

In one embodiment, the conduit 66 is integrated with a beam that provides structural support to the upper level of the structure. For example, as shown in FIGS. 7A and 7B, the conduit 66 is formed by adding sidewalls 74 to a structural I-beam 80, creating a conduit 66 in the form of a W-beam with a flow path or trough 76 on each side of the central I-beam 80. In this embodiment, the beam component 80 serves both structural and process functions. It provides structural support to the MBR facility and returns water to the aerobic basin. This integration of structural and process components simplifies the construction of the structure and reduces the amount of complex piping necessary to carry the wastewater throughout the facility. The integrated conduit 66 and elevated membrane chamber 40 work together to provide a compact, efficient flowpath for the wastewater circulating through the MBR. Instead of passing the water from the aerobic basin to a separate membrane chamber and then pumping the water back to the aerobic basin through a series of pipes or channels, the present MBR 10 lifts the water into an elevated membrane chamber within the aerobic basin. From this elevated membrane chamber, the water can simply pass by gravity flow through the integrated conduit 66 back to the aerobic basin.

The water that flows through the conduit 66 back to the aerobic basin 26 passes once again through the aerobic basin 26 where it is biologically treated as described before. This recycling of water from the membrane chamber 40 back to the aerobic basin 26 further ensures that the wastewater is thoroughly treated before it is pumped out. This recycling also prevents solid waste from accumulating in the membrane modules 50. If too much sludge accumulates on the membrane fibers, the sludge can block the filtration of clear water through the membrane fibers. Approximately three to five times the average daily inflow to the membrane filtration is recycled back from the membrane chamber 40 to the aerobic basin 26 through the conduits 66. This high rate of recycling is needed to carry the sludge out of the membrane tank and take it back into aerobic basin so that it doesn't collect on the membranes.

When the solid sludge that accumulates on the outer surface of the filters is returned to the wastewater by the air scour, some of the mixed wastewater and solids are pumped out for processing of these solids. Waste pumps 82 are located at an end 46a of the common outlet channel 46 (see FIG. 2). These pumps remove a small fraction of the mixed water and solids flowing into the outlet channel 46. The pumps 82 can be individually adjusted to control the amount of waste pumped out.

The waste pumps 82 deliver the mixed liquid and solid sludge to a thickener 84 (see FIG. 5) where the solid sludge is de-watered and thickened. Different types of thickeners could be used, such as drum, belt, gravity, centrifuge, or screw thickeners, which remove the water and leave the solid sludge behind. The water is returned to the anoxic basins 26. The sludge is then passed through three aerobic digester tanks 86a, 86b, 86c (see FIGS. 2 and 5) for post-processing of the sludge. In the aerobic digester, the sludge is biochemically oxidized by bacteria in an aerobic environment. Air is pumped into the digester tanks to encourage the bacteria to process the sludge, which reduces the sludge volume. These digester tanks may be arranged with the first two in parallel followed by the third in series, or in another suitable arrangement. The digester tanks are relatively large to allow a sufficiently long processing time for the solid sludge. After the solids have been treated in the digester, they are passed to a dewatering device such as a centrifuge 88 (see FIG. 5) where they are further de-watered. The dewatered sludge is packaged and stored for transportation to a landfill where they are finally disposed, or alternatively transported elsewhere for recycling and reuse. This process completes the removal of the solid sludge from the treated wastewater.

As mentioned briefly before, clear liquid water is drawn through the membrane fibers in the membrane modules 50, leaving the solid sludge behind. This clear water is pumped to a disinfection station 64 where it is disinfected, such as by ultra-violet radiation, ozonation, or chemical disinfectants. From there it is passed to large percolating ponds where it is discharged into the ground, evaporated into the air, and/or diverted for irrigation or other uses. This completes the treatment of the wastewater and its return back to the environment. In other embodiments, the water can be discharged in other ways other than percolating ponds, such as direct discharge into rivers, injection into groundwater, and others.

An alternative arrangement of the membrane chamber 40' is shown in FIGS. 12A-12D. These figures show a design in which a pipe 94 connects the common inlet channel 42 to each membrane tank 44. In one embodiment, the pipe 94 is U-shaped, extending down from the common inlet channel 42 to a first elbow 94a, passing below the membrane module floor 47 to a second elbow 94b, and then curving up and exiting into the membrane tank 44.

The U-shaped pipe 94 efficiently transports the waste water from the inlet channel 42 into each membrane tank 44. In the embodiment shown in FIGS. 12A-D, each tank 44 has four membrane modules 50, although in other embodiments more or fewer modules can be provided in each tank. In the embodiment shown, the pipe 94 has an outlet 96 that is centered between the four modules 50. Locating the outlet 96 in approximately the center of the tank 44 between the four modules 50 helps to evenly distribute the flow of water toward the modules 50. Additionally, a plate 98 is positioned above the outlet 96 to divert the incoming water toward the modules 50. When the water passes through the pipe 94 and through the elbow 94b, it exits through the outlet 96 in a vertical direction. The plate 98 diverts the water into a horizontal direction and evenly distributes the water toward the four modules 50 in the tank 44. In one embodiment, the plate 98 is positioned about one foot above the outlet 96. This distance could be adjustable, or it could be stationary and fixed. The distance may be a function of the pipe diameter, such that the circular area of the pipe outlet is equal to the surface area of a cylinder extending down from the plate to the pipe. With these areas equal, the flow rate of the water through the pipe and out under the plate into the membrane tank 44 can be constant.

Figure 12A:
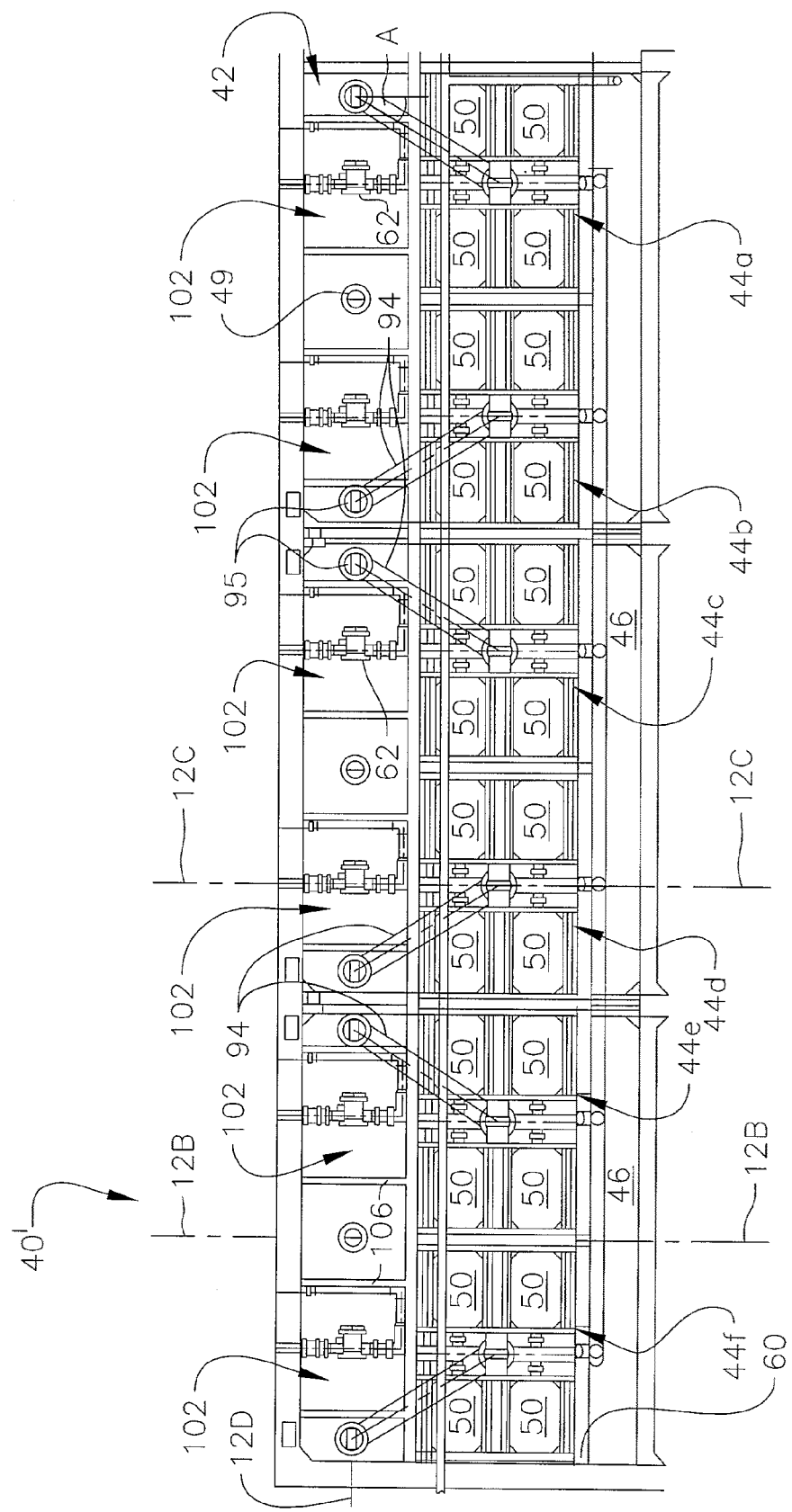
FIG. 12A is a partial top plan view of a membrane bioreactor according to an embodiment of the invention.

The U-shaped pipe 94 is offset, as shown in FIG. 12A, in that it extends at an angle A between the inlet channel 42 and the tanks 44. This angle A may be any angle, depending on the particular layout of the membrane chamber 40. The pipe 94 is positioned at angle A in order to accommodate a pump chamber 102 within the common inlet channel 42. As shown in FIGS. 12A, 12C, and 12D, a pump chamber 102 is provided in the inlet channel 42 opposite each membrane tank 44. The chamber 102 has its own floor 104 that is raised above the floor 47 of the inlet channel 42 and has side walls 106 that separate the chamber 102 from the water in the inlet channel 42, keeping the chamber 102 dry. The dry chamber 102 houses the outlet pump 62 that pumps clear water from the membrane modules 50 to the disinfection station 64 and from there to percolating ponds 65, as described above.

In the embodiment shown, one outlet pump 62 is provided for each membrane tank 44, meaning one pump 62 for each set of four modules 50 in the embodiment shown. As shown in FIG. 12A, the pump 62 is horizontally aligned with the center of the set of four modules 50, so that the water drawn through these modules 50 is combined into one outlet stream and pumped straight through the pump 62 to the disinfection station. As shown in FIG. 12C, the pump 62 is vertically aligned with the top of the modules 50, so that the clean water drawn through the modules 50 passes straight (horizontally) through the pump 62 without elevational changes or turns. In other embodiments, more or fewer pumps 62 can be provided to pump the clear water from the membrane modules 50.

The pump chamber 102 keeps the outlet pump 62 (and its associated instrumentation, controllers, and valves, and space to access the pump) dry, insulating it from the water flowing through the inlet channel 42. Additionally, the pump chamber 102 gives the membrane module 50 a compact design, with the pump 62 contained within the inlet channel 42. In one embodiment, the pump chamber 102 is fully contained within the inlet channel 42, although in other embodiments it can extend only partially into the inlet channel. By using space in the inlet channel 42 to house the pump 62, the design is compact and efficient, and the need for additional conduits, piping, and structure between the various components in the membrane chamber 40 can be minimized.

The chamber 102 is sized to be large enough to provide access space for maintenance and repair of the pump 62, while not being so large that it displaces too much volume in the inlet channel 42. In one embodiment, the side walls 106 of the pump chamber 102 are about 6 feet in height, and the floor 104 of the pump chamber 102 is elevated about 7 feet above the floor 47 of the inlet channel 42.

A gate 108 is coupled to the inlet 95 of the pipe 94 to control the flow of water into each membrane tank 44. In one embodiment, the gate 108 is a flap gate that is held open by an actuator or chain to open the inlet 95, and that can be closed by lowering the flap to close the flap gate 108 over the inlet 95. When the gate 108 is closed, the corresponding membrane tank 44 can be taken off-line for maintenance, cleaning, or repairs. To bring the tank 44 back on-line, water is pumped back through the tank 44 to equalize the pressure on either side of the gate 108, and the gate 108 is then opened to restart the flow of water into the tank 44. Instead of a gate, other shut-off devices such as a mud-valve can be used. Each tank 44 has its own U-shaped pipe 94 so that the flow of water into each tank 44 can be separately controlled. When one tank 44 is taken off-line for maintenance, the other tanks can continue to operate.

As mentioned above, the U-shaped pipe 94 is offset by angle A so that it is not directly under the pump chamber 102. The inlet 95 to the pipe 94 is located within the inlet channel 42 away from the pump chamber 102, and away from the feed pipe 49. The pipe 94 extends at angle A from the inlet 95 in order to position the outlet 96 directly across from the pump chamber 102, between the four membrane modules 50. This design facilitates uniform circulation of the waste water as it is lifted from the second end 34 of the aerobic chamber through the feed pipe 49 into the inlet channel 42 and then into and through the pipe 94 to the membrane tanks 44. This design also provides clearance for operation of the flap gate 108 (or other type of shut-off device) above the inlet 95, without interfering with the pump chamber 102. However, the inlet 95 to the pipe 94 can be located anywhere within the inlet channel 42, depending on the particular layout of the MBR and the size of the various components.

In one embodiment, the pipe 94 has a diameter of about 24 inches, although the diameter can be bigger or smaller depending on the size of the MBR and the rate of water flow. The distance between the pipe 94 and the floor 47 is enough to accommodate the elbows 94a, 94b.

Figure 12B:
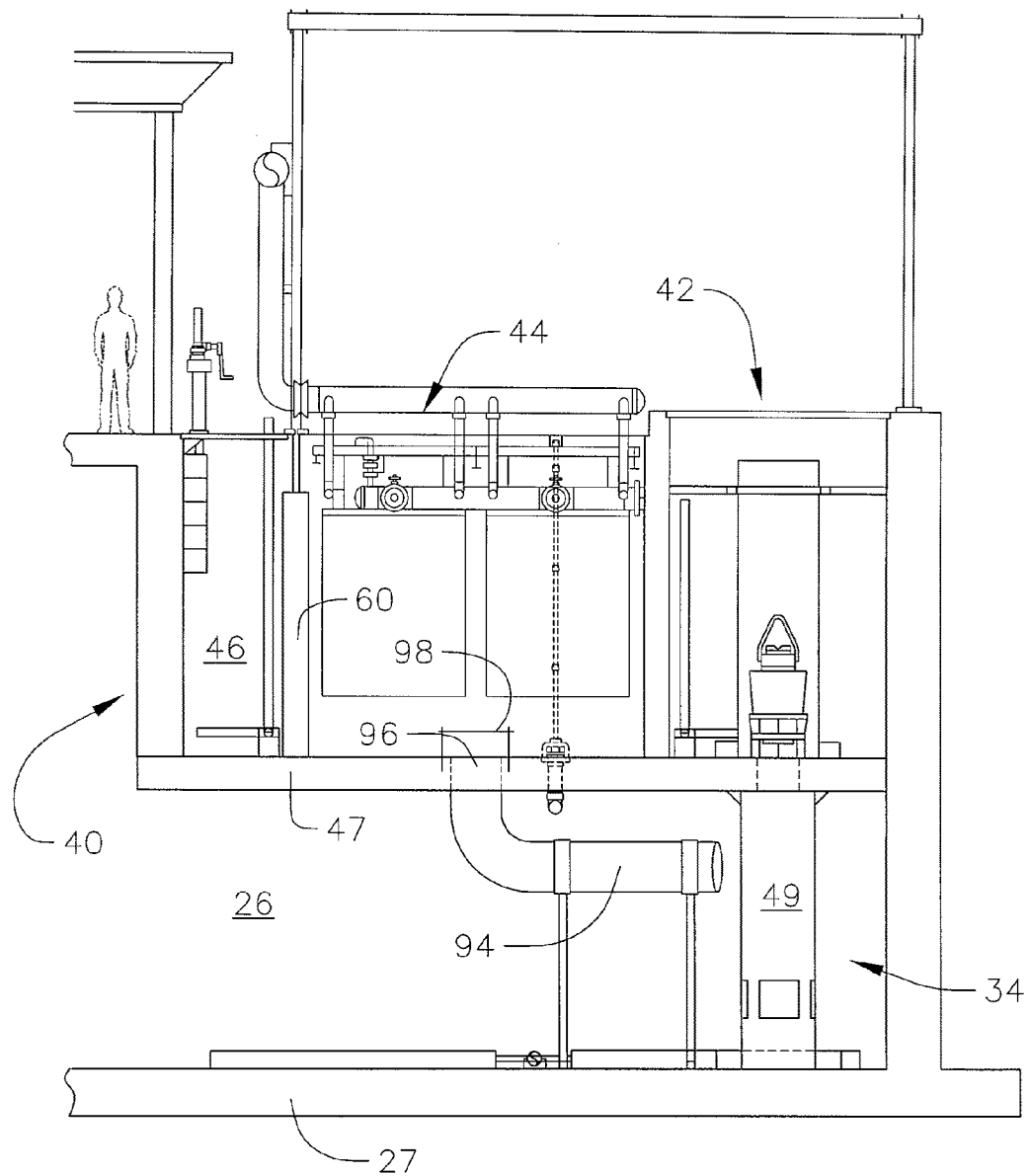
FIG. 12B is a partial side cross-sectional view of the membrane bioreactor of claim 12A, taken along the line 12B.
Figure 12C:
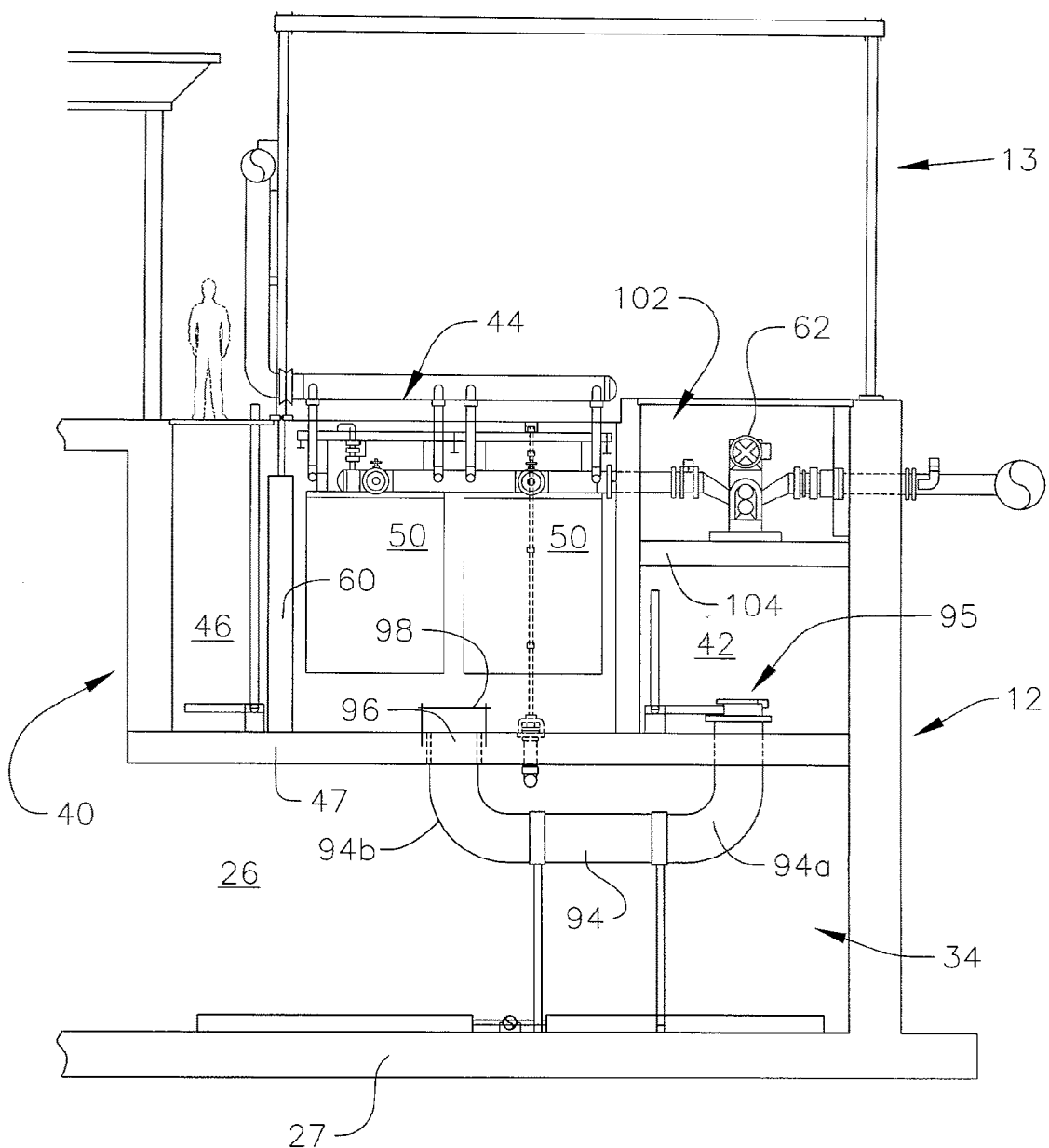
FIG. 12C is a partial side cross-sectional view of the membrane bioreactor of claim 12A, taken along the line 12C.

As shown in FIGS. 12B-12C, the floor 47 of the membrane chamber 40 is sloped, becoming thicker toward the inlet channel 42 and thinner toward the outlet channel 46. This creates an upwardly sloping ceiling in the outlet end 34 of the aerobic basin 26. This slope is provided in order to prevent an air pocket from developing and becoming trapped under the membrane chamber 40, exerting upward force on the membrane floor 47. Because the floor 47 of the membrane chamber is sloped, any air bubbles in the aerobic chamber 26 can escape by following the slope.

Returning to the beginning of the process, the headworks station 18 will be briefly described. As mentioned before, wastewater is delivered by a sewer pipe into the lift station 14. The lift station 14 is designed as an integrated component within the MBR tank structure, as shown in FIG. 2. Lift station pumps 16 lift the incoming sewage into the headworks station 18. The headworks station 18 is built on a second level 13 of the MBR, above the lower level 12 (see FIGS. 5 and 6).

The headworks station 18 screens the incoming water to remove trash, debris, grit, and other large solid material. This step is important because debris can damage the fibers in the membrane modules 50 downstream if it is not removed first, reducing the life span of the membrane module 50 and the quality of the effluent water. Solids accumulation within the MBR can also damage pumps, clog pipes, reduce the effectiveness of biological processes, and occupy tank space.

The headworks station 18 splits the incoming water into two treatment trains, which are both passed through a primary coarse screen and then a vortex grit separation unit, where the water is spun in a spiral so that the heavier grit falls out. The grit, dirt, and solids are dewatered and bagged for sending to a landfill. After the coarse screen and grit separation, excess or overflow wastewater can be directed to equalization basins 90a, 90b for storage. During but not limited to high flow events or times of high energy demand or cost, overflow water is stored in these equalization basins. If the first equalization basin 90a fills, additional incoming water can be diverted into the second basin 90b. The use of mixers or aeration ensures that biological solids remain suspended and are not deposited on floor of equalization basins. When the inflow has reduced and this overflow water can be processed, it can be pumped or drained by gravity from the equalization basins to the lift station 14 and back through the headworks station 18. After the coarse screen and grit separation, the water that is continuing to the anoxic basins is passed through a fine screen and then dropped into the anoxic inlet splitter box 20 where it is divided into the three parallel treatment trains described above.

Another embodiment of a headworks station 318 is shown in FIGS. 13A-D. The headworks station 318 includes a three-stage screening system that is contained within a compact housing 320. Dirt and debris are removed from the wastewater in three consecutive separation stages as the water flows through the headworks station 318, before the water flows into the anoxic basin. The compact design of the housing 320 reduces the amount of space and structure (such as pipes, pumps and other equipment) needed to move the water through the three stages of screening, while still providing a thorough and effective screening of the incoming wastewater before it enters the anoxic basin.

Wastewater enters the headworks station 318 through feed pipe 322 from the lift station and flows into an inlet area 324 within the housing 320. At this point, the wastewater is divided into two parallel processing trains or flow paths, a first flow path 326 and a second flow path 328. An inlet gate 330 controls the flow of water into each path 326, 328. The gates 330 can be individually controlled to close one flow path for maintenance or repair, while keeping the other flow path operating.

When the water enters the flow path through the gate 330, it first passes through a coarse screener 332. The coarse screener 332 includes a basket or drum 334 with a coarse screen, such as a 6 mm slot screen. The coarse screener 332 could include various types of screens, such as basket, drum, band, slot, etc. Water passes through the drum and through the coarse screen inside the drum. The screen catches dirt and other debris in the water. Water level is measured before and after the screen. Once the difference in level reaches a pre-set value, the drum 334 starts rotating and debris is dropped onto a conveyor 336 which transports the debris to a bin or other container 338 outside of the housing 320. The debris collected in this container 338 is removed to a landfill or otherwise disposed. This first stage of screening removes dirt and debris greater than about 6 mm in a dimension, and efficiently transports this debris to the bin 338 for removal.

Figure 13A:
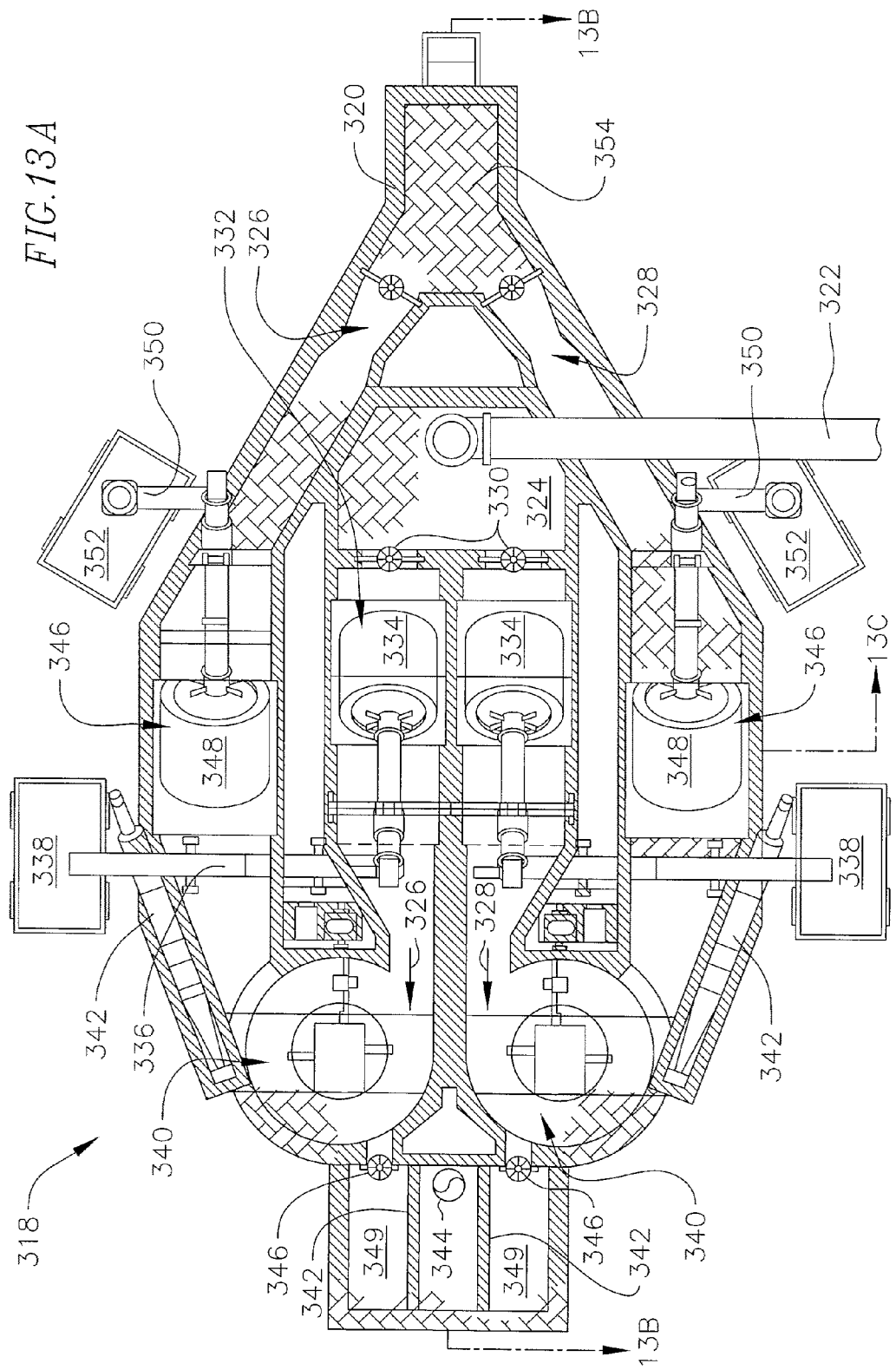
FIG. 13A is a top cross-sectional view of a headworks station according to an embodiment of the invention.
Figure 13B:
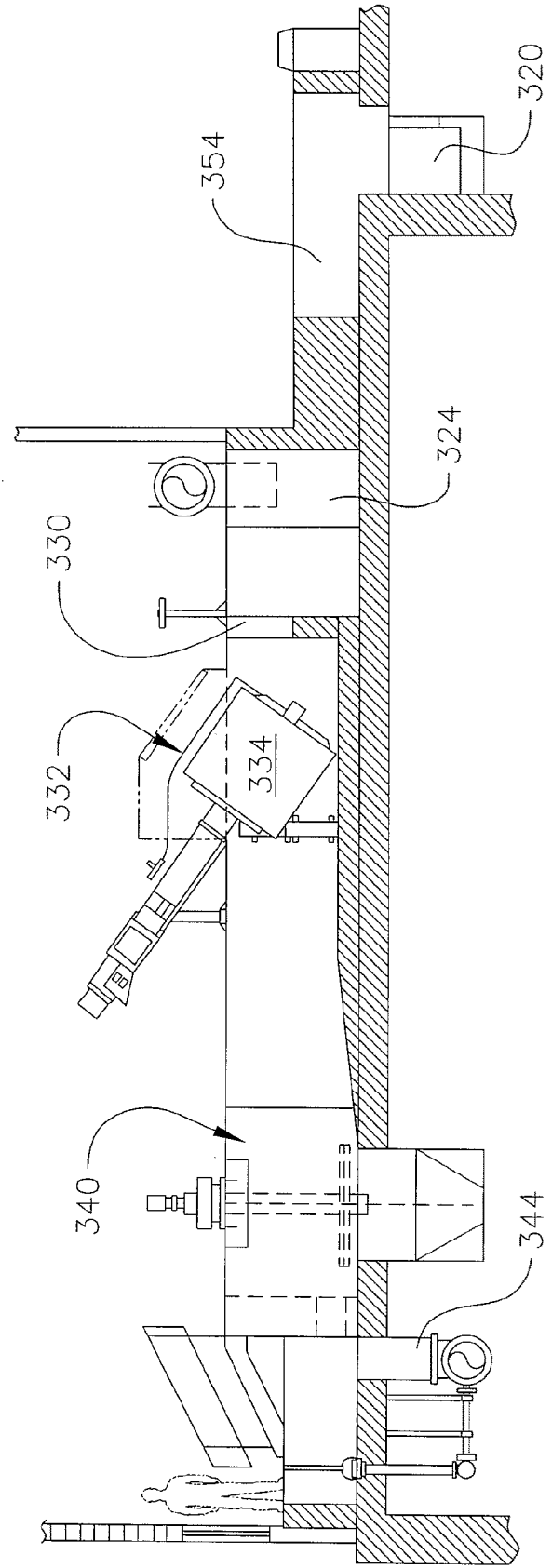
FIG. 13B is a partial side cross-sectional view of the headworks station of FIG. 13A taken along the line 13B.
Figure 13C:
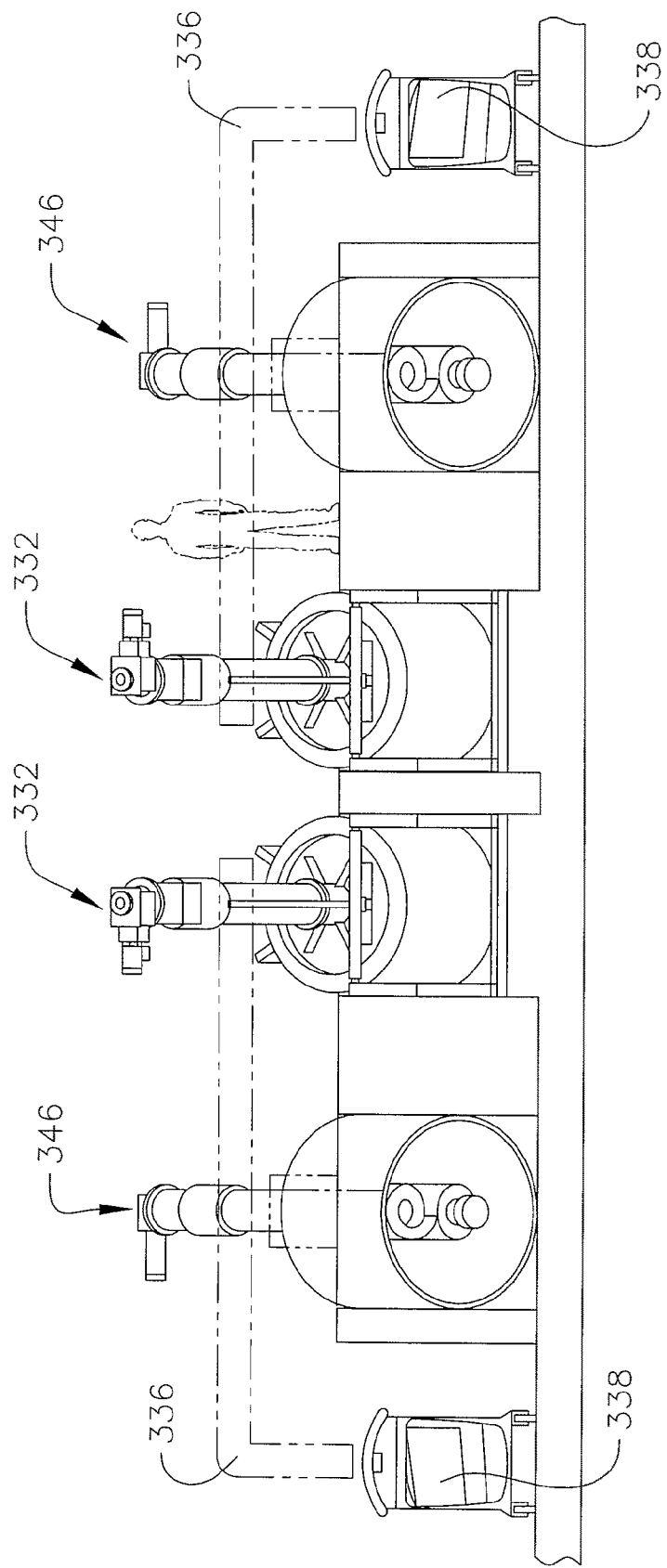
FIG. 13C is a partial end cross-sectional view of the headworks station of FIG. 13A taken along the line 13C.
Figure 13D:
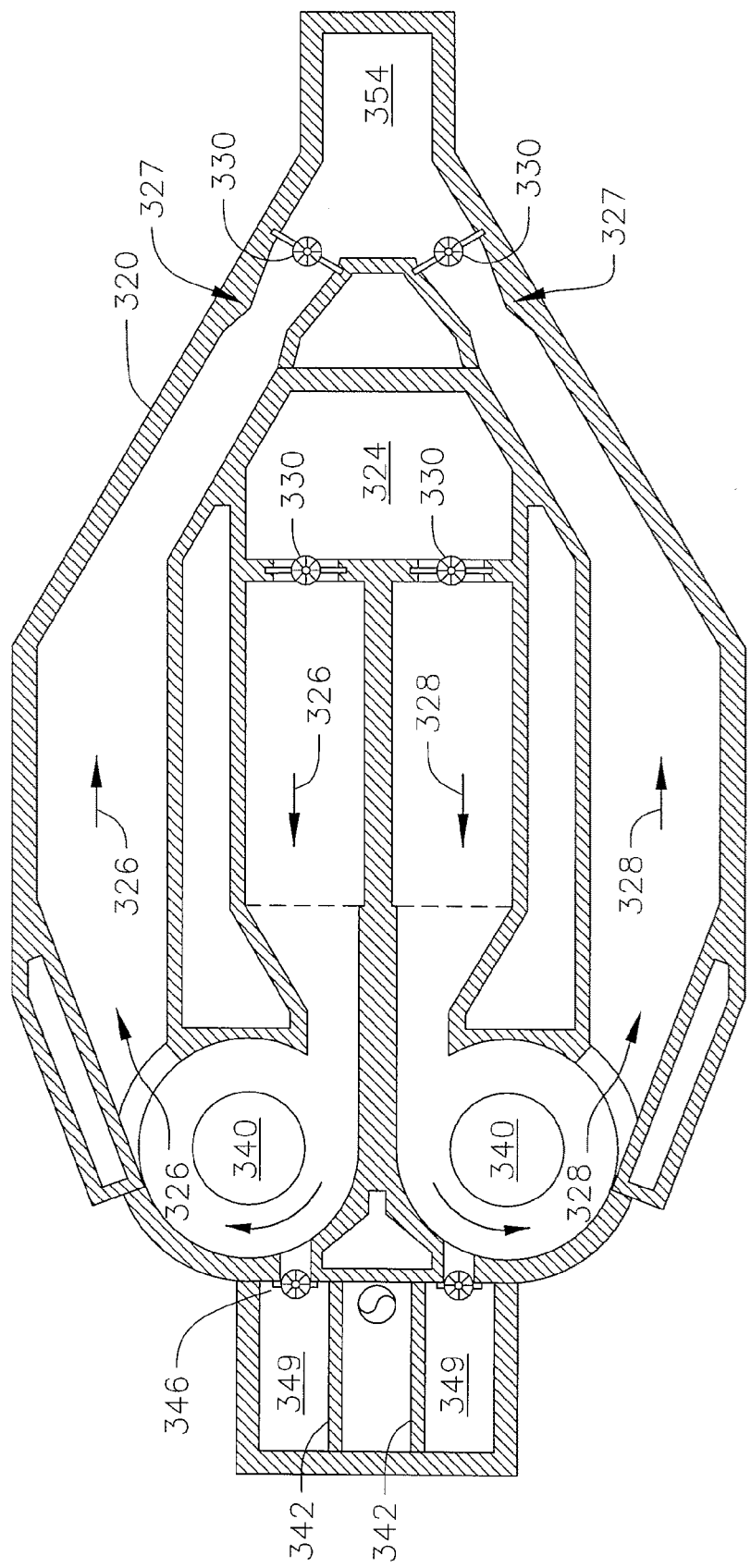
FIG. 13D is a top cross-sectional view of the headworks station of FIG. 13A, with screening and other equipment removed for clarity.

After passing through the coarse screener 332, the sewage water in each flow path flows into the second separation stage. The second separation stage takes place in a vortex 340, which circulates the water to remove grit and other smaller particles that passed through the coarse screen. Optionally, the vortex 340 includes paddles that spin the wastewater around through the vortex. As the water circulates around the vortex 340, grit and dirt particles, which are heavier than the water, fall to the center of the vortex and are then transported to a second conveyor 342 that takes the grit to the same bin 338 mentioned earlier. The arrows in FIG. 13D show the flow of water in each flow path 326, 328 into and around the vortex 340.

From the vortex 340, the sewage water either flows further through the headworks station 318, or it passes through gates 346 into overflow boxes 349. The water in each box 349 then flows over a weir 342, and water from the two flow paths combines to flow into a pipe 344 that leads to the first equalization basin (see equalization basins 90 in FIG. 2). If necessary, the water can overflow from the first equalization basin into the second equalization basin. The gates 346 are adjustable, so that the rate of water flowing through the headworks station 318 into the MBR can be controlled. To reduce the amount of water flowing into the MBR, the gate 346 can be opened further, so that more water overflows into the equalization basin. To increase the amount of water flowing into the MBR, the gate can be partially or completely closed. In another embodiment, the gates 346 are used as fine controls to adjust the amount of water flowing into the equalization basins, while the coarse or main control is provided by the weir 342. The gates 346 are adjusted to trim the flow of water to the desired level.

When the MBR is at full capacity, accepting its maximum inflow of water, any excess overflow water passes through the gate into the equalization basins. Thus, high flow situations such as floods are handled by diverting the excess water into the equalization basins. The water that is stored in the equalization basins has already passed through the coarse screener 332 and at least partly around the vortex 340, so at least a portion of the dirt and debris in this water is already removed before the water is stored for later treatment. The coarse screener 332 is sized to handle high flow rates so that all incoming water can be screened before it flows into the MBR or into the equalization basins for storage.

When the water passes through the gates 346, the two flow paths 326, 328 combine to flow into the equalization basin. Water that does not pass into the equalization basins remains separated in the two flow paths 326, 328 flows around the vortex 340 and continues on toward the third separation stage, the fine screener 346. As the water flows around the vortex and then on through the housing 320, it changes course by about 180°, heading back in the direction of the inlet, but now flowing outside the coarse screener 332. Diverting the water in this way, turning it about 180°, keeps the structure of the headworks station 318 and the housing 320 compact, so that the water does not have to travel through a great distance in order to pass through the three separation stages.

The fine screener 346 includes a rolling drum or basket 348, similar to the coarse screener 332. Fine dirt particles that are caught by the fine screener 346 drop out of the rolling drum 348 onto a conveyor 350 which transports the dirt to bins 352 for disposal. In one embodiment, the fine screener 346 includes a 1-2 mm perforated screen. This very fine screen catches small dirt particles that remain suspended in the water after the water has passed through the coarse screener 332 and grit vortex 340.

After passing through the fine screen 346, the water flows to the outlet 354, where it drops by gravity flow into the anoxic inlet splitter box 320. The water in both treatment trains 326, 328 combines in the outlet 354 and flows together into the splitter box 320, where the water is distributed into the anoxic basins, as described before. Gates 330 are also provided in each flow path before the outlet 354, so that the individual flow paths can be isolated for maintenance.

In one embodiment, after the fine screen 346, the water flows through a flow meter 327, which is a throttled or narrowed region in each flow path 326, 328 prior to the outlet 354. The flow meters 327 meter the influent flow for the plant, to determine and control the amount of water entering the anoxic basins.

This three-stage headworks station 318 provides thorough screening of the wastewater in a compact structure. Thorough screening is desirable so that dirt and debris do not clog the filters in the membrane modules downstream. The headworks station 318 is contained on one level, so the water does not need to be pumped to a higher level for different stages of screening. Three different types of separation are accomplished in a small, compact space. The headworks station 318 can fit inside one room on the upper level 13 of the MBR.

In one embodiment, the height H of the housing 320 is about 6 feet. The housing 320 is covered on top, so that the space above the housing is usable for accessing and repairing the station 318 or for other purposes. Air scrubbers are provided below the cover, between the cover and the water, to prevent odor. The headworks station 318 is located on the second level 13 of the MBR, above the digester tanks 86a, 86b as shown in FIGS. 1-2. The outlet 354 of the headworks station 318 is positioned to feed into the splitter channel 20 shown in FIG. 1.

Operations buildings, including process equipment, laboratories, workshops, break rooms, and administrative offices are built on the second level 13 above the tank structures on the lower level 12, which helps to reduce land requirements for the MBR. That is, as shown for example in FIG. 4B, buildings with these offices and laboratories are built directly on top of the lower level 12 of the MBR. The various tanks in the lower level 12, such as the anoxic basins 24, the aerobic basins 26, and the membrane modules 40, are closed on top with a cover, such that the additional facilities can be built directly above the tanks. Covering the basins on the lower level 12 is advantageous because it makes the space above them useable. The buildings above the lower level can house the control rooms, headworks, and laboratories needed to operate the MBR facility, including control systems, monitors, alarms, data storage, and other equipment. The covers on the tanks can be designed and structurally rated as needed for whatever traffic loads will be applied from the upper level 13. In one embodiment, the buildings supported above the MBR are not built above the membrane tanks, which remain uncovered, or perhaps covered with a grate, or covered by a raised cover that is higher than the top of the tanks. This allows equipment such as a crane to access the membrane tanks to remove and replace the membrane modules 50 for repair and maintenance.

Figure 4B:
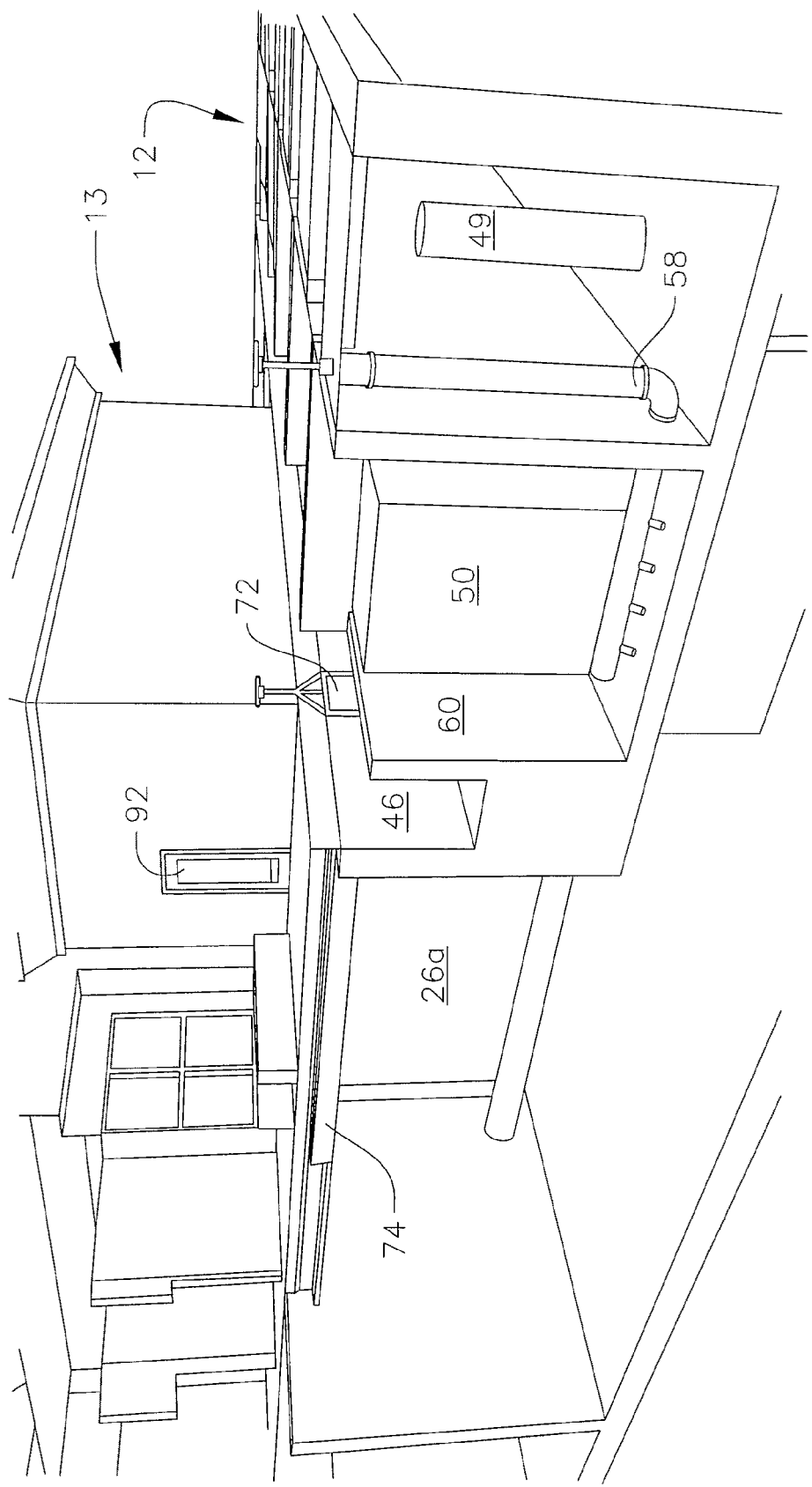
FIG. 4B is an enlarged perspective view of a portion of a membrane bioreactor according to an exemplary embodiment.

In an exemplary embodiment, the lower level 12 is underground, as shown for example in FIG. 4B, where the door 92 indicates ground level. Thus, the lower level 12 (see FIGS. 1 and 6) can be built entirely, or at least partially, underground. This design reduces the visual exposure of the tanks and saves land space. Additionally, the equipment such as the headworks 18 on the second level 18, 318 does not need to be lifted above ground. Access to the tanks from above is also easier when the tanks are below ground. Also, the temperature of the tanks can be more easily controlled when the tanks are below ground, because their exposure to sunlight is reduced. Maintaining the tanks at a constant temperature is helpful to control the biological processes going on in the treatment basins.

Another feature of the MBR 10 that reduces its overall footprint and saves land space is the use of common-wall tanks. As shown for example in FIGS. 1 and 2, adjacent tanks share a common wall, rather than having two separate walls for each tank. For example, the anoxic tank 24a shares a common wall with the digester tank 86a, with the equalization basin 90b, with the aerobic tank 26a, and with the anoxic tank 24b. Common-wall construction is used throughout the MBR 10 in order to create a more compact design and save space. This design also reduces the amount of piping, concrete, and electrical conduit needed around and between the various tanks. The cost of the facility can also be reduced as fewer total tank walls need to be built.

Figure 8:
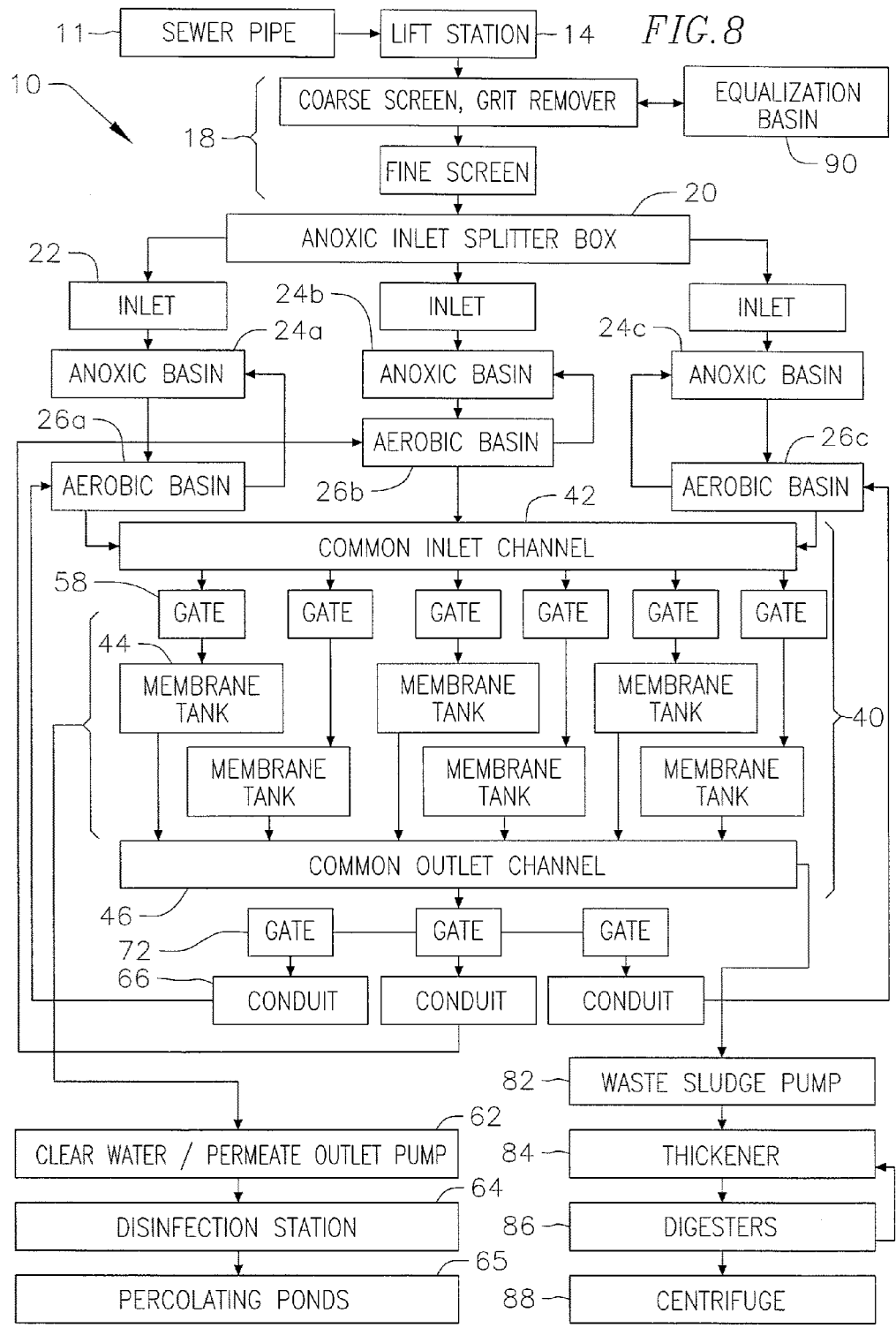
FIG. 8 is a schematic diagram illustrating the flow of wastewater through a membrane bioreactor according to an exemplary embodiment of the invention in a first operating condition.

A schematic diagram showing the flow of wastewater through the various components of the MBR is shown in FIG. 8. Water enters the MBR 10 from a sewer pipe 11 and flows into the lift station 14. The lift station pumps lift the incoming sewage into the headworks 18, where it passes through the coarse screen, grit remover, and fine screen. Overflow water passes to the equalization basin 90.

After passing through the fine screen, the wastewater flows into the anoxic inlet splitter channel 20, which divides the wastewater into three separate process trains. The water passes through one of three inlets 22 into one of three anoxic basins 24. The water flows from the anoxic basin into the aerobic basin 26. Water is recycled from the aerobic basin 26 back to the anoxic basin 24 by the recycle pump 38 and pipe 39, as described before.

A portion of the wastewater is pumped from the aerobic basin 26 into the common inlet channel 42, lifted by the membrane chamber feed pump 48 through the pipe 49. The water from the three parallel process trains combines in the common inlet channel 42. From there, it flows through individual gates 58 into membrane tanks 44. Most of the water flows around the membrane fibers in the membrane tanks 44 and flows into the common outlet channel 46. From there it flows through one of three gates 72 into one of the three conduits 66, which each return the water to one of the aerobic basins 26.

Water drawn through the membrane fibers is pumped out of the membrane tank 44 by a clear water or permeate outlet pump 62 to the disinfection station 64 and from there to percolating ponds 65.

Waste sludge is pumped from the common outlet channel 46 by waste pumps 82 to the thickener 84, and from there to the digesters 86 and finally the centrifuge 88 before being transported to a landfill or other proper disposal destination.

Figure 9:
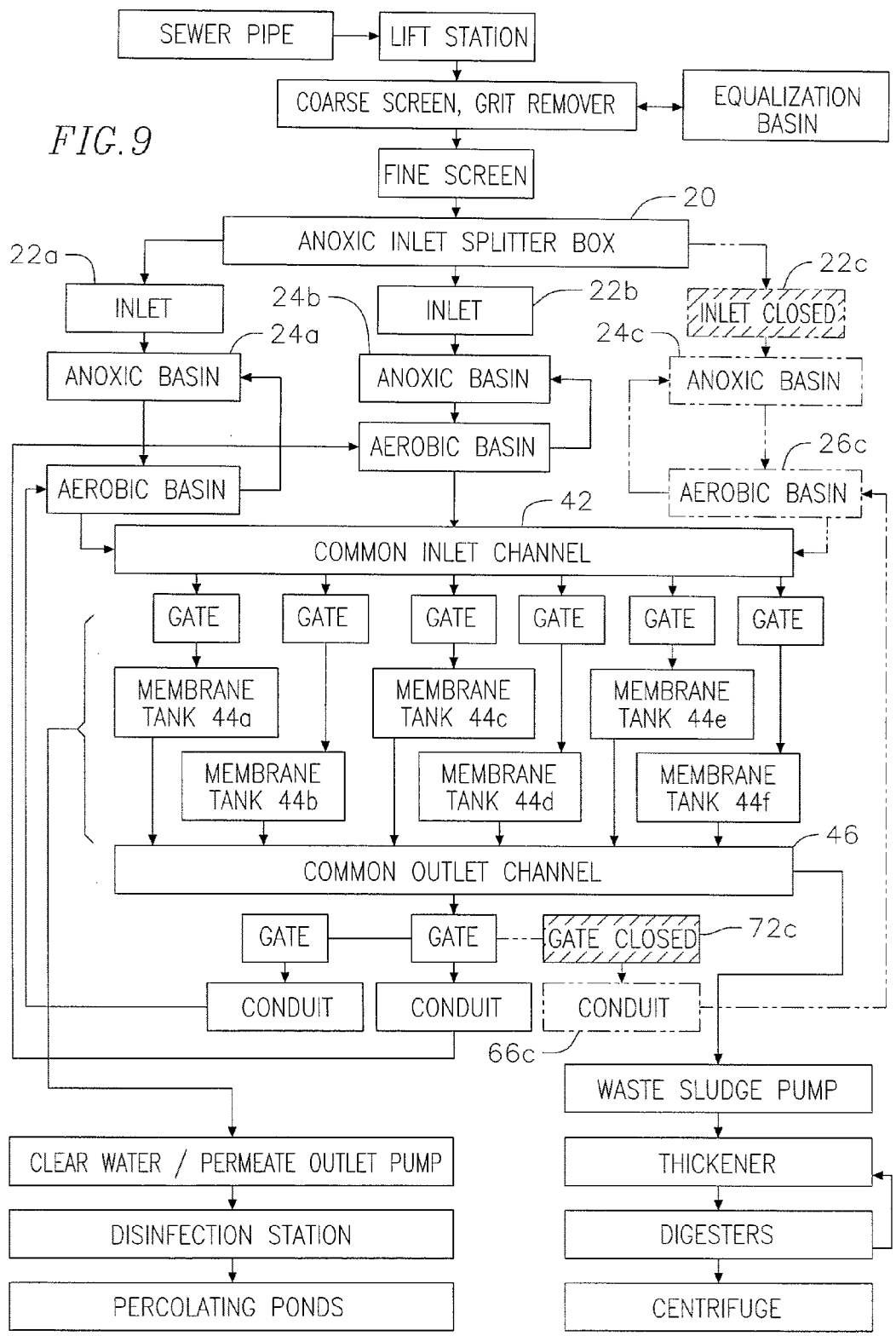
FIG. 9 is a schematic diagram illustrating the flow of wastewater through the membrane bioreactor of FIG. 8 in a second operating condition.

The MBR described above has a modular design that enables individual tanks and basins to be controlled and operated independently of each other. One basin can be taken off-line for maintenance or cleaning without requiring all up- and downstream tanks to also be shut down. For example, the MBR system 10 in FIG. 8 is shown in a first operating condition, where all tanks and basins are operating. The system is shown in FIG. 9 in a second operating condition, with one anoxic/aerobic train shut down for maintenance. The inlet 22c to the third anoxic basin 24c is closed, preventing wastewater from flowing into the anoxic tank 24c from the anoxic inlet splitter box 20. The gate 72c into the conduit 66c leading back to the third aerobic basin 26c is also closed, preventing the wastewater in the membrane chamber 40 from flowing through the conduit 66c back to the aerobic basin 26c. The closed inlet 22c and gate 72c prevent water from entering the anoxic basin 24c and aerobic basin 26c, which enables the anoxic basin 24c and/or aerobic basin 26c to be repaired or cleaned.

However, in this second operating condition in FIG. 9, all of the membrane tanks 44 continue to operate, even when the anoxic basin 24c and aerobic basin 26c are off-line. The wastewater from the operating aerobic basins 26a, 26b combines in the common inlet channel 42 and flows into all six of the membrane tanks 44. The two membrane tanks 44e, 44f elevated above the off-line aerobic basin 26c can still operate. Wastewater flows through these tanks and into the common outlet channel 46 where it is directed back to the two operating aerobic basins 26a, 26b.

Figure 10:
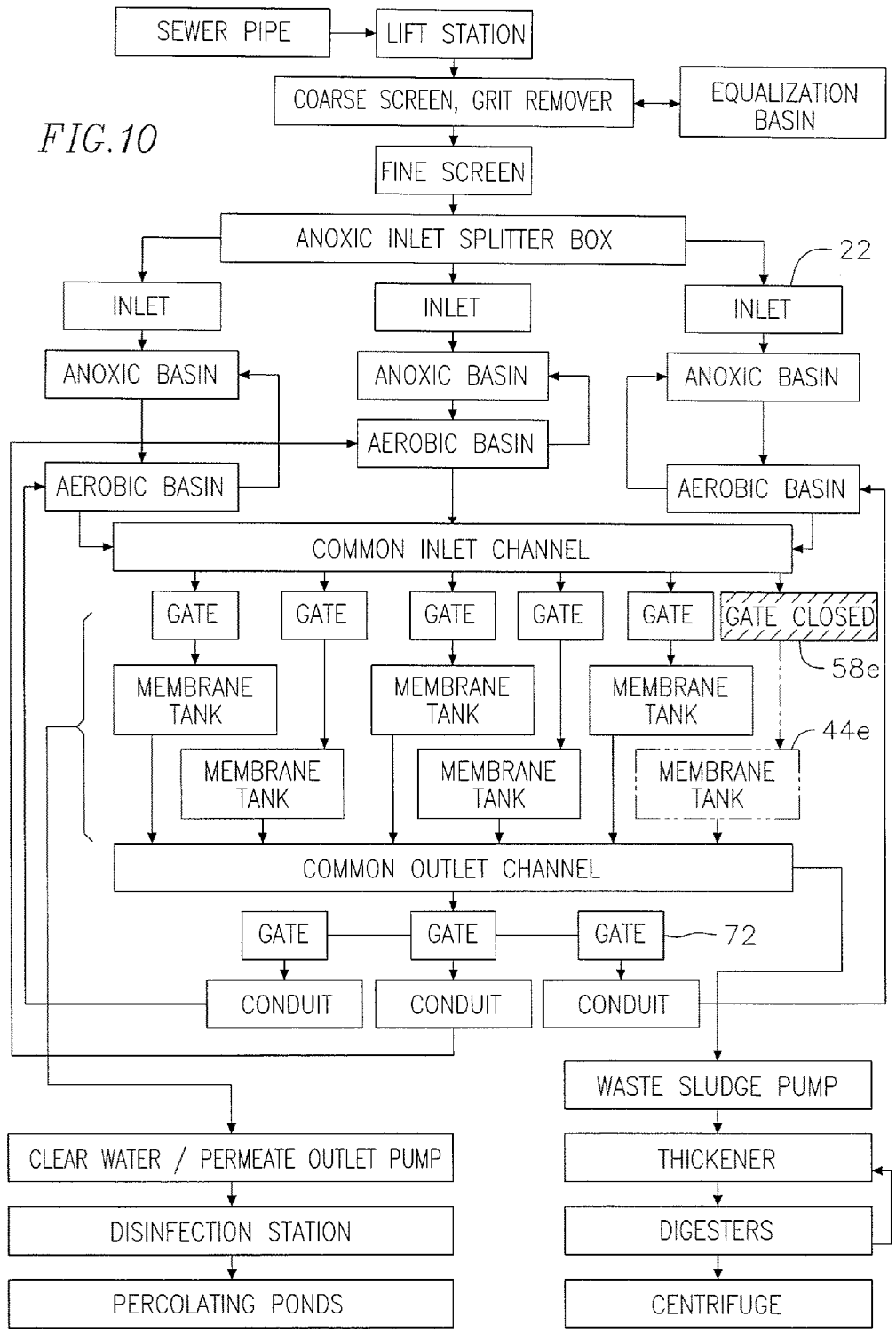
FIG. 10 is a schematic diagram illustrating the flow of wastewater through the membrane bioreactor of FIG. 8 in a third operating condition.

Another operating condition is shown in FIG. 10, where membrane tank 44e is shut down for maintenance. The gate 58e is closed to cover the inlet into the membrane tank 44e. However, all other membrane tanks 44 can continue to operate. Additionally, the anoxic basin 24c and aerobic basin 26c upstream of the closed membrane tank 44e can also continue to operate.

Thus, the individual inlets and gates 22, 58, 72 and the common inlet channel 42 and outlet channel 46 can be used in various configurations to direct the wastewater into the operating basins and tanks and prevent wastewater from flowing into non-operating tanks. The inlet and outlet sides of each aerobic and membrane tank can be operated independently, so that various circulation paths can be created. This modular design enables tanks to continue operating up- and downstream of non-operating tanks. When one tank requires maintenance, it is not necessary to shut down one-third of the MBR's operating tanks. Instead, individual gates and inlets can be closed while the remaining tanks and basins continue to operate.

The various membrane tanks 44 can also operate independently of each other, with, for example, an air scour applied in one, no air scour in another, and a backflush applied in another tank, all at the same time. The MBR facility 10 includes a control system (not shown) with networked processors and dedicated software that enables the operator to select certain tanks for maintenance or cleaning or other operating modes.

The modular design described above and shown in the Figures provides a more efficient MBR system that functions at high capacity even during maintenance and that is easy to operate and maintain.

Figure 11:
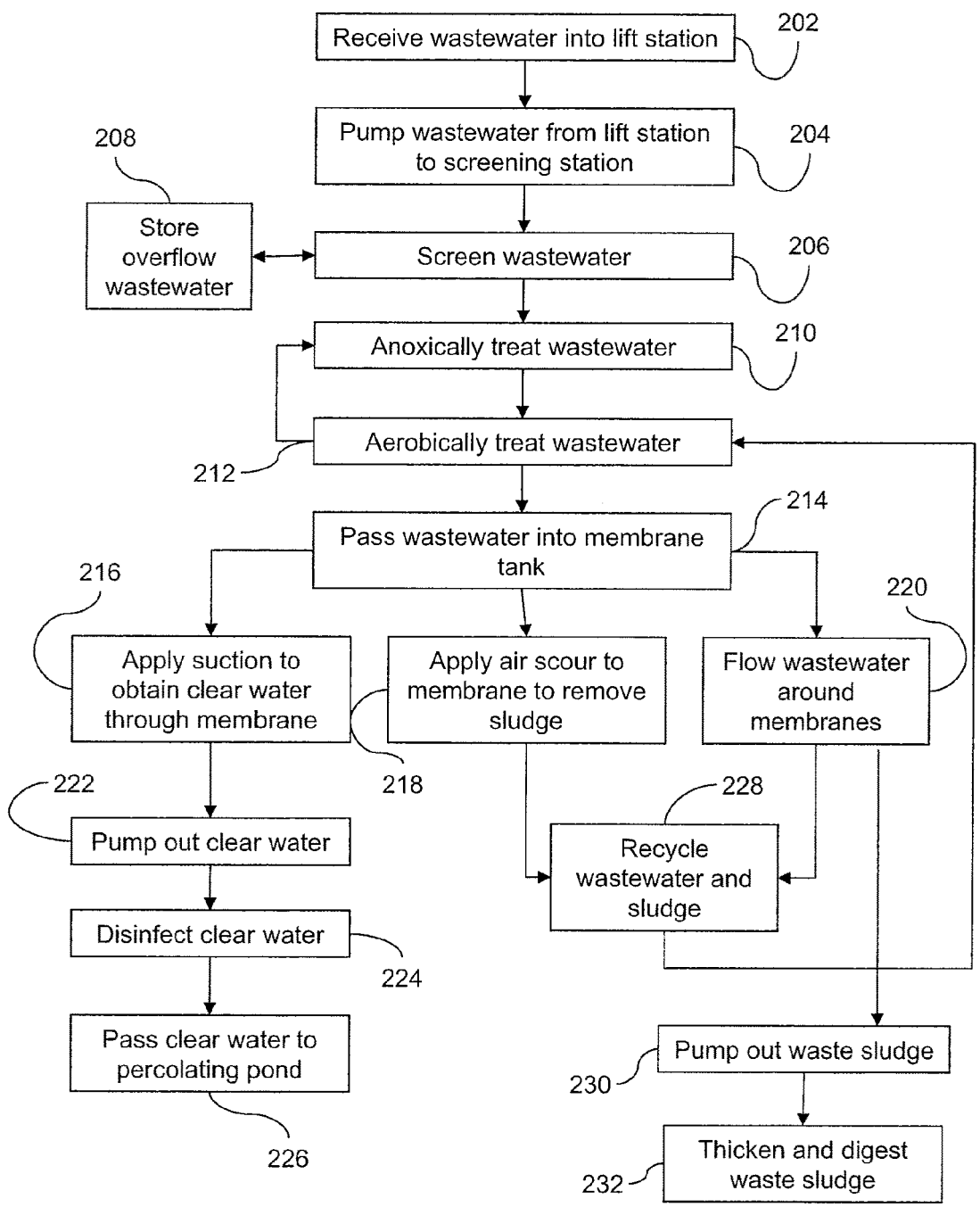
FIG. 11 is a flowchart of a method of treating wastewater according to an embodiment of the invention.

FIG. 11 shows a method of treating wastewater according to another embodiment of the invention. The method includes receiving wastewater into a lift station (202), and pumping the wastewater from the lift station to a screening or headworks station (204). Next the wastewater is screened (206), with overflow wastewater stored (208) and then screened again (206). The method includes anoxically (210) and aerobically (212) treating the screened wastewater, and then passing the wastewater into a membrane tank (214). From there, the method includes applying suction to obtain clear water through the membrane (216), applying an air scour to the membrane to remove sludge (218), and flowing wastewater around the membranes (220). After clear water is drawn through the membrane, the clear water is pumped out (222) and disinfected (224) and then passed to a percolating pond (226). The sludge removed from the membranes and the wastewater passed around the membranes is recycled (228), and it is passed back through the MBR to be aerobically treated (212). The method also includes pumping out waste sludge 230 and thickening and digesting the waste sludge (232).

Although limited embodiments of the membrane bioreactor and its components have been specifically described and illustrated herein, modifications and variations will be apparent to those skilled in the art. As an example, where an embodiment is shown with a particular number of components, such as four membrane modules per tank, or three treatment trains, or four lift station pumps, the invention is not limited to that number, and more or fewer components can be provided. Accordingly, it is to be understood that the membrane bioreactor and its components constructed according to principles of this invention may be embodied other than as specifically described herein. The invention is also defined in the following claims.

What is claimed is:

1. A membrane bioreactor for treatment of wastewater, comprising:

first and second anoxic basins for anoxic treatment of such wastewater;

first and second aerobic basins for aerobic treatment of such wastewater, the first and second aerobic basins arranged in series with the first and second anoxic basins, respectively;

a first flow path connecting the first anoxic basin and the first aerobic basin, and a second flow path connecting the second anoxic basin and the second aerobic basin, for flow of the wastewater from the respective anoxic basin into the respective aerobic basin;

a membrane chamber comprising a plurality of membrane tanks, the membrane chamber being arranged in series with the aerobic basins, and the membrane tanks being arranged in parallel with each other; and third and fourth flow paths connecting the membrane chamber to the first and second aerobic basins, respectively, wherein the membrane chamber comprises a floor that is elevated above and extends over a floor of at least one of the aerobic basins.

2. The membrane bioreactor of claim 1, wherein the membrane chamber is located within the first and second aerobic basins.

3. The membrane bioreactor of claim 1, wherein the membrane bioreactor comprises a first level and a second level constructed above the first level, and wherein the anoxic basins, the aerobic basins, and the membrane chamber are located on the first level.

4. The membrane bioreactor of claim 3, wherein the first level extends at least partially underground.

5. The membrane bioreactor of claim 1, wherein the membrane chamber comprises a common inlet channel and a common outlet channel, and wherein the plurality of membrane tanks are positioned between the common inlet channel and the common outlet channel.

6. The membrane bioreactor of claim 5, further comprising a pump chamber extending into the common inlet channel and housing a pump for pumping clean water from a corresponding membrane tank.

7. The membrane bioreactor of claim 5, wherein the third and fourth flow paths comprise first and second conduits, each conduit connecting the common outlet channel to the first or second aerobic basin, respectively.

8. The membrane bioreactor of claim 7, wherein the first and second conduits each comprise a beam having a sidewall.

9. The membrane bioreactor of claim 8, wherein the first and second conduits comprise an outlet portion where the sidewall is removed, and wherein the outlet portion of each conduit is above a first end of the respective aerobic basin.

10. The membrane bioreactor of claim 5, further comprising a plurality of pipes, each pipe extending between the common inlet channel and one of the membrane tanks.

11. The membrane bioreactor of claim 10, wherein each pipe extends at a non-perpendicular angle between the common inlet channel and the respective membrane tank.

12. The membrane bioreactor of claim 11, wherein each pipe extends below the floor of the membrane chamber.

13. The membrane bioreactor of claim 10, further comprising a plurality of pump chambers, and each pump chamber extending into the common inlet channel and housing a pump for pumping clean water from a corresponding membrane tank.

14. The membrane bioreactor of claim 13, wherein each pump is located at the same elevation as an outlet of a membrane module within the corresponding membrane tank.

15. The membrane bioreactor of claim 13, wherein each pipe has an inlet that is positioned away from the pump chamber in the common inlet channel.

16. The membrane bioreactor of claim 1, wherein the membrane chamber floor extends into both the first and second aerobic basins.

17. The membrane bioreactor of claim 1, wherein the membrane chamber floor is sloped.

18. The membrane bioreactor of claim 1, further comprising a headworks station upstream of the anoxic basins, the headworks station comprising a coarse screener, a grit vortex, and a fine screener that are contained in series within a housing, and a fluid flow path passing through the coarse screener, the grit vortex, and the fine screener, wherein the fluid flow path curves by about 180° between the coarse screener and the fine screener.

19. The membrane bioreactor of claim 1, wherein a common wall is shared by each of the following: the first anoxic basin and the first aerobic basin, the second anoxic basin and the second aerobic basin, the first and second anoxic basins, and the first and second aerobic basins, and wherein the anoxic basins and the aerobic basins are covered.

20. The membrane bioreactor of claim 1, wherein each aerobic basin comprises a first end proximate the respective anoxic basin and a second end opposite the first end, and wherein the membrane bioreactor further comprises a first recycle flow path connecting the second end of the first aerobic basin to the first anoxic basin, and a second recycle flow path connecting the second end of the second aerobic basin to the second anoxic basin, the first and second recycle flow paths being located proximate the floor of the respective aerobic basin.

21. A membrane bioreactor for treatment of wastewater, comprising:
first and second anoxic basins for anoxic treatment of such wastewater;
first and second aerobic basins for aerobic treatment of such wastewater, the first and second aerobic basins being connected by first and second fluid flow paths to the first and second anoxic basins, respectively, for flow of the wastewater from the respective anoxic basin into the respective aerobic basin, wherein each aerobic basin comprises a first end proximate the respective anoxic basin and a second end opposite the first end;
a membrane chamber extending into the first and second aerobic basins, wherein the membrane chamber comprises a common inlet channel, a common outlet channel, and a plurality of membrane tanks between the common inlet channel and the common outlet channel, and wherein the membrane chamber comprises a floor elevated above a floor of the aerobic basins;
a membrane module in each of the plurality of membrane tanks;
a first conduit extending from the common outlet channel across the first aerobic basin to the first end of the first aerobic basin; and
a second conduit extending from the common outlet channel across the second aerobic basin to the first end of the second aerobic basin.

22. The membrane bioreactor of claim 21, wherein the first and second conduits each comprise a beam having one or more sidewalls forming a trough, and wherein each beam comprises an outlet portion over the respective aerobic basin.

23. The membrane bioreactor of claim 22, wherein each beam comprises a structural beam that provides structural support to the bioreactor.

24. The membrane bioreactor of claim 21, wherein the anoxic basins and the aerobic basins are covered and are located on a lower level of the membrane bioreactor, and further comprising an upper level constructed above the lower level.

25. The membrane bioreactor of claim 21, further comprising a first recycle flow path connecting the second end of the first aerobic basin to the first anoxic basin, and a second recycle flow path connecting the second end of the second aerobic basin to the second anoxic basin, the first and second recycle flow paths being located proximate the floor of the respective aerobic basin.

26. The membrane bioreactor of claim 21, further comprising a headworks station upstream of the anoxic basins, the headworks station comprising a coarse screener, a grit vortex, and a fine screener that are contained in series within a housing, and a fluid flow path passing through the coarse screener, the grit vortex, and the fine screener, wherein the fluid flow path turns by about 180° between the coarse screener and the fine screener.

27. A membrane bioreactor for treatment of wastewater, comprising:

first and second anoxic basins for anoxic treatment of such wastewater;

first and second aerobic basins for aerobic treatment of such wastewater, the first and second aerobic basins being connected by first and second fluid flow paths to the first and second anoxic basins, respectively, for flow of the wastewater from the respective anoxic basin into the respective aerobic basin;

a membrane chamber extending into the first and second aerobic basins, wherein the membrane chamber comprises a common inlet channel, a common outlet channel, a plurality of membrane tanks between the common inlet channel and the common outlet channel, and a plurality of feed pipes extending between the common inlet channel and the membrane tanks, and wherein the membrane chamber comprises a floor elevated above a floor of the aerobic basins;

a membrane module in each of the plurality of membrane tanks;

a first conduit extending from the common outlet channel to the first aerobic basin; and a second conduit extending from the common outlet channel to the second aerobic basin wherein each feed pipe extends below the floor of the membrane chamber and has an outlet in the corresponding membrane tank.

28. A membrane bioreactor for treatment of wastewater, comprising:

first and second anoxic basins for anoxic treatment of such wastewater;

first and second aerobic basins for aerobic treatment of such wastewater, the first and second aerobic basins being connected by first and second fluid flow paths to the first and second anoxic basins, respectively, for flow of the wastewater from the respective anoxic basin into the respective aerobic basin;

a membrane chamber extending into the first and second aerobic basins, wherein the membrane chamber comprises a common inlet channel, a common outlet channel, a plurality of membrane tanks between the common inlet channel and the common outlet channel, and a plurality of feed pipes extending between the common inlet channel and the membrane tanks, and wherein the membrane chamber comprises a floor elevated above a floor of the aerobic basins;

a membrane module in each of the plurality of membrane tanks;

a first conduit extending from the common outlet channel to the first aerobic basin; and a second conduit extending from the common outlet channel to the second aerobic basin wherein the membrane chamber further comprises a plurality of pump chambers, each pump chamber extending into the common inlet channel and having a pump operably connected to one of the membrane tanks for pumping clean water from the membrane tank.

29. The membrane bioreactor of claim 28, wherein the pump is located at the same elevation as an outlet of the corresponding membrane tank.

30. A membrane bioreactor for treatment of water, comprising:

an anoxic basin for anoxic treatment of water;

an aerobic basin for aerobic treatment of the water, the aerobic basin being fluidically connected in series with the anoxic basin, wherein the aerobic basin comprises a first end proximate the anoxic basin and a second end opposite the first end;

a common inlet channel fluidically connected in series with the aerobic basin; and a plurality of membrane tanks fluidically connected in parallel with each other and in series with the common inlet channel, wherein the common inlet channel is positioned above the second end of the aerobic basin, and further comprising a vertical feed pipe for lifting the water from the second end of the aerobic basin through the vertical feed pipe into the common inlet channel.

31. The membrane bioreactor of claim 30, wherein the membrane tanks comprise a floor that is elevated above and extends over a floor of the aerobic basin.

32. The membrane bioreactor of claim 31, further comprising a plurality of feed pipes, each feed pipe connecting the common inlet channel to one of the membrane tanks, and wherein the feed pipe extends below the floor of the membrane tanks.

33. The membrane bioreactor of claim 31, further comprising a common outlet channel fluidically connected in series with the membrane tanks, and further comprising a gravity flow path connecting the common outlet channel to the first end of the aerobic basin for flow of the water from the common outlet channel to the first end of the aerobic basin by gravity, and wherein the flow path extends over the aerobic basin.

34. The membrane bioreactor of claim 33, wherein the flow path comprises a structural beam providing a conduit for water flow and providing structural support to the membrane bioreactor.

35. The membrane bioreactor of claim 30, wherein the membrane bioreactor comprises a first level and a second level constructed above the first level, and wherein the anoxic basin, the aerobic basin, and the membrane tanks are located on the first level, and further comprising a headworks station upstream of the anoxic basin, the headworks station being located on the second level and comprising a coarse screener, a grit vortex, and a fine screener that are contained in series within a housing, and a fluid flow path passing through the coarse screener, the grit vortex, and the fine screener, wherein the fluid flow path turns by about 180° between the coarse screener and the fine screener.

36. The membrane bioreactor of claim 30, wherein each membrane tank is coupled to a pump for pumping clean water from the respective membrane tank, and wherein the pump is vertically aligned with an outlet of the respective membrane tank.

37. The membrane bioreactor of claim 36, wherein the pump is housed in a pump chamber that is located within the common inlet channel.

* * * * *